United States Patent
Bianchi et al.

(10) Patent No.: US 10,591,088 B2
(45) Date of Patent: Mar. 17, 2020

(54) PIPE-LAYING VESSEL AND METHOD OF LAYING A PIPELINE

(75) Inventors: Stefano Bianchi, Cernusco (IT); Kimon Tullio Ardavanis, Sanremo (IT); Michel Pierre Armand Baylot, Saint Paul le Jeune (FR); Yann Hajeri, Treviso (IT)

(73) Assignee: SAIPEM S.P.A., Milan (IT)

( * ) Notice: Subject to any disclaimer, the term of this patent is extended or adjusted under 35 U.S.C. 154(b) by 584 days.

(21) Appl. No.: 13/978,911

(22) PCT Filed: Jan. 26, 2012

(86) PCT No.: PCT/EP2012/051271
§ 371 (c)(1),
(2), (4) Date: Jul. 10, 2013

(87) PCT Pub. No.: WO2012/101233
PCT Pub. Date: Aug. 2, 2012

(65) Prior Publication Data
US 2013/0294838 A1   Nov. 7, 2013

(30) Foreign Application Priority Data

Jan. 28, 2011 (GB) .................................. 1101579.9

(51) Int. Cl.
*F16L 1/19* (2006.01)
*F16L 1/20* (2006.01)
*F16L 1/18* (2006.01)

(52) U.S. Cl.
CPC .................................. *F16L 1/19* (2013.01); *F16L 1/18* (2013.01); *F16L 1/20* (2013.01)

(58) Field of Classification Search
CPC ....... F16L 1/12; F16L 1/14; F16L 1/16; F16L 1/19; F16L 1/205; F16L 1/225
(Continued)

(56) References Cited

U.S. PATENT DOCUMENTS 3,011,318 A * 12/1961 Ashton ................... E21B 15/02
                                                                 405/209
3,658,222 A    4/1972 Dressel et al.
(Continued)

FOREIGN PATENT DOCUMENTS

EP    0 020 257 A1   12/1980
EP    0 657 670 A2    6/1995
(Continued)

OTHER PUBLICATIONS

International Search Report (PCT/ISA/210) dated Oct. 5, 2012, by the European Patent Office as the International Searching Authority for International Application No. PCT/EP2012/051271.
(Continued)

*Primary Examiner* — Tara Mayo-Pinnock
(74) *Attorney, Agent, or Firm* — Buchanan Ingersoll & Rooney PC

(57) ABSTRACT

A pipe-laying vessel including a pipe-laying tower extending upwardly from the vessel, the tower including a first lower section extending upwardly from a proximal end to a distal end above the main deck of the vessel, and a second upper section movably mounted on the first lower section, and the tower having a first pipe-laying configuration for laying pipeline P in which the upper section is positioned above the lower section and pipe is passed from the upper section to the lower section when, in use, it is being laid, and a second stowed configuration in which the second upper section is moved relative to the lower section and the overall height of the tower is reduced.

31 Claims, 21 Drawing Sheets

(58) Field of Classification Search
USPC ......... 405/158, 166, 168.1, 168.4, 169, 170; 414/745.8
See application file for complete search history.

(56) References Cited

U.S. PATENT DOCUMENTS

| | | | |
|---|---|---|---|
| 3,860,122 | A | 1/1975 | Cernosek |
| 4,068,490 | A | 1/1978 | Jegousse |
| 4,431,342 | A | 2/1984 | Torresen et al. |
| 4,472,079 | A | 9/1984 | Langner |
| 5,421,675 | A | 6/1995 | Brown et al. |
| 5,464,307 | A | 11/1995 | Wilkins |
| 5,836,719 | A | 11/1998 | Martin et al. |
| 6,273,643 | B1 | 8/2001 | Baugh |
| 6,352,388 | B1 | 3/2002 | Seguin |
| 6,361,250 | B1 | 3/2002 | De Varax |
| 6,592,297 | B2 | 7/2003 | Frijns et al. |
| 6,910,848 | B1 | 6/2005 | Baugh |
| 7,713,000 | B2 | 5/2010 | Verkuijl et al. |
| 7,806,628 | B2 | 10/2010 | Willis |
| 2001/0033773 | A1 | 10/2001 | Baugh |
| 2001/0041095 | A1 | 11/2001 | Baugh |
| 2002/0009333 | A1 | 1/2002 | Willis et al. |
| 2002/0021943 | A1 | 2/2002 | Frijns |
| 2006/0249292 | A1 | 11/2006 | Guidry |
| 2007/0258772 | A1 | 11/2007 | Bursaux et al. |
| 2008/0118311 | A1 | 5/2008 | Roodenburg et al. |
| 2008/0170911 | A1 | 7/2008 | Snowdon et al. |
| 2009/0220306 | A1 | 9/2009 | Roodenburg et al. |
| 2010/0107956 | A1 | 5/2010 | Foce |
| 2010/0119307 | A1 | 5/2010 | Pollack et al. |
| 2010/0176079 | A1* | 7/2010 | Lucas ................ B63B 35/4413 212/307 |
| 2011/0081204 | A1 | 4/2011 | Van Grieken et al. |

FOREIGN PATENT DOCUMENTS

| | | | |
|---|---|---|---|
| EP | 0 661 488 | A1 | 7/1995 |
| EP | 1 102 698 | A2 | 5/2001 |
| EP | 1 696 163 | A1 | 8/2006 |
| EP | 2 208 853 | A2 | 7/2010 |
| GB | 1 498 748 | A | 1/1978 |
| GB | 1 499 247 | A | 1/1978 |
| GB | 2 336 191 | A | 10/1999 |
| GB | 2 469 519 | A | 10/2010 |
| WO | WO 01/07812 | A1 | 2/2001 |
| WO | 0174657 | A1 | 10/2001 |
| WO | 02057675 | A1 | 7/2002 |
| WO | WO 2004/068012 | A2 | 8/2004 |
| WO | WO 2005/085692 | A1 | 9/2005 |
| WO | WO 2005/095835 | A1 | 10/2005 |
| WO | WO 2006/085739 | A1 | 8/2006 |
| WO | WO 2007/000609 | A2 | 1/2007 |
| WO | WO 2007/108673 | A1 | 9/2007 |
| WO | WO 2007/120035 | A1 | 10/2007 |
| WO | WO 2008/041837 | A1 | 4/2008 |
| WO | WO 2008/099355 | A1 | 8/2008 |
| WO | 2008107186 | A1 | 9/2008 |
| WO | WO 2008/120977 | A1 | 10/2008 |
| WO | 2009022175 | A1 | 2/2009 |
| WO | WO 2009/148297 | A1 | 12/2009 |
| WO | WO 2009/153352 | A2 | 12/2009 |
| WO | WO 2009/153354 | A2 | 12/2009 |
| WO | WO-2010052690 | A2 * | 5/2010 ............ B63B 35/03 |
| WO | WO 2010/071412 | A1 | 6/2010 |
| WO | WO 2011/010207 | A1 | 1/2011 |
| WO | WO 2011/016719 | A1 | 2/2011 |

OTHER PUBLICATIONS

Written Opinion (PCT/ISA/237) dated Oct. 5, 2012, by the European Patent Office as the International Searching Authority for International Application No. PCT/EP2012/051271.
International Search Report (PCT/ISA/210) dated Aug. 2, 2012, by the European Patent Office as the International Searching Authority for International Application No. PCT/EP2012/051270.
Written Opinion (PCT/ISA/237) dated Aug. 2, 2012, by the European Patent Office as the International Searching Authority for International Application No. PCT/EP2012/051270.
The extended European Search Report dated Jul. 9, 2019, by the European Patent Office in corresponding European Application No. 19180126.5. (10 pages).

* cited by examiner

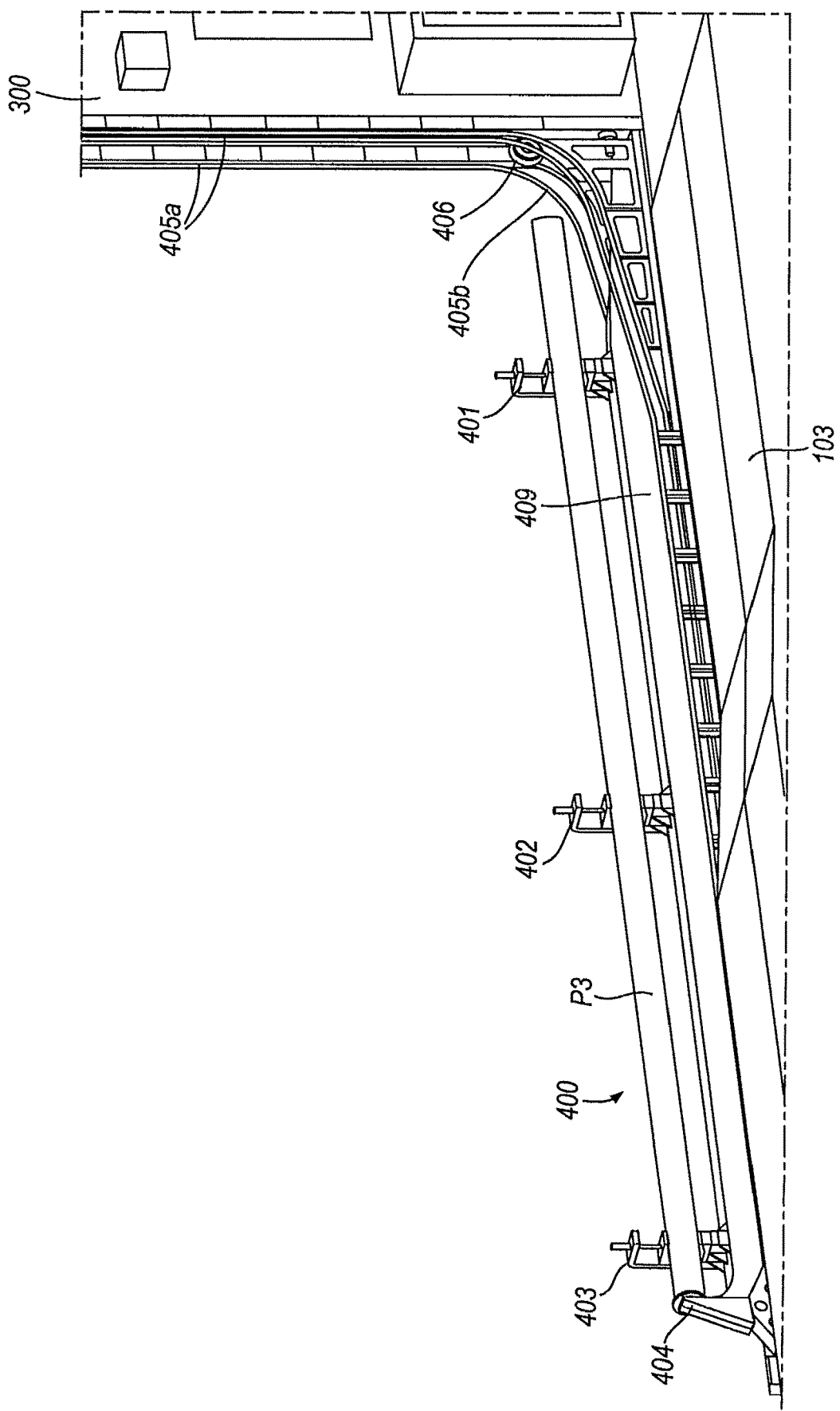

PIPE-LAYING VESSEL AND METHOD OF LAYING A PIPELINE

BACKGROUND OF THE INVENTION

This invention relates to pipe-laying vessels and to methods of laying a pipeline. Such vessels and methods are of particular use in the offshore industry relating to oil and gas production.

One of the tasks that is carried out by certain vessels in the offshore industry is that of laying pipelines, either by S-laying or by J-laying.

In "S" laying, the pipeline leaves the vessel at little or no inclination to the horizontal, adopts a steeper inclination in the water and then returns to a generally horizontal disposition on the seabed. The tension in the pipeline is often accommodated by a series of track tensioners mounted along the pipe-laying path, on the vessel. The track tensioners support the weight of the pipeline and control passage of the pipeline. S laying is preferred in shallower water where the natural path of the pipeline is only ever inclined at a shallow angle as it passes to the seabed. Examples of S-laying arrangements are shown in WO 2006/085739 and WO 2007/000609.

In "J" laying, the pipeline leaves the vessel at a steep or vertical inclination and the inclination steadily reduces until the pipeline is in a generally horizontal disposition on the seabed. J laying often involves moving a new pipeline section from a substantially horizontal position (along the deck of the vessel) into a vertical position to align with a J lay tower mounted on the vessel. A lower end of the new pipeline section is welded to the upper end of the pipeline, which is held in place, suspended from the vessel, by a fixed clamp, located towards the bottom of the J lay tower. Once the new section of pipeline has been added to the existing pipeline, the fixed clamp is released and the pipeline lowered down the J lay tower. During such lowering the tension in the pipeline may be accommodated by a travelling block or track tensioners. The upper end of the newly lengthened pipeline (i.e. the upper end of the new section of pipeline) is then clamped by the fixed clamp, the travelling block, if used, is returned to its original position towards the top of the J lay tower and the process repeated. J-laying is used primarily for laying pipeline in deep water (that is typically deeper than 1,000 m). Examples of J-laying arrangements are shown in WO 2009/153352 and WO 2009/153354.

It is an object of the invention to provide an improved pipe-laying vessel and an improved method of laying a pipeline.

SUMMARY OF THE INVENTION

The present invention provides, according to a first aspect, a pipe-laying vessel including a pipe-laying tower extending upwardly from the vessel, the tower comprising a first lower section extending upwardly from a proximal end to a distal end above the main deck of the vessel, and a second upper section movably mounted on the first lower section, and the tower having a first pipe-laying configuration for laying pipeline in which the upper section is positioned above the lower section and pipe is passed from the upper section to the lower section when, in use, it is being laid, and a second stowed configuration in which the second upper section is moved relative to the lower section and the overall height of the tower is reduced.

Having an upper section able to move relative to a lower section allows the pipe-laying tower to have a stowed configuration where the overall height of the tower is reduced. This allows the pipe-laying tower to be stowed for transit. This makes the tower (and the vessel) more stable and less vulnerable to wind gusts. This is because the centre of gravity of the tower is reduced. It also reduces the likelihood of fatigue in the structure. In addition, by reducing the overall height of the tower, the vessel is more likely to be able to pass under bridges or other overhead obstructions.

More preferably, the height of the tower can be reduced so that the height of the vessel in the stowed configuration from the bottom of its keel line is less than 85 m, preferably approximately 81.5 m. This is in comparison to a height of the vessel in the pipe-laying configuration of approximately 125 m.

Preferably, a first end of the second upper section is pivotally connected to the distal end of the first lower section to enable the tower to be converted between the first pipe-laying configuration and the second stowed configuration. Having the upper section pivotally connected to the lower section allows the tower to be converted to and from the stowed configuration by a pivoting motion. Having the second upper section connected to the distal end of the first lower section allows a large reduction in height of the tower (substantially down to the height of the lower section of the tower) when the tower is in the second stowed configuration.

More preferably, the second section is pivotable in relation to the first section such that a second end of the second section can pivot down to be supported on a deck of the vessel when in the second stowed configuration. This allows the height of the tower to be reduced to approximately the height of the lower section. This enables the tower height to be reduced considerably. It also allows the upper section to be supported on the deck of the vessel, which increases the stability of the tower and the vessel and reduces the movement of the second upper section due to wind and wave gusts.

Preferably, the first section extends upwardly at its proximal end at a fixed angle with respect to the main deck of the vessel. This means that it is not necessary to provide means for changing the angle of the proximal end of the first section. It also allows the proximal end of the first section to be permanently positioned in its upwardly extending position, which means it can be more securely mounted to the vessel.

More preferably, the proximal end of the first section is an integral part of the body of the vessel. This enables both the overall strength of the body of the vessel and the overall strength of the fixing of the tower to the body of the vessel to be strengthened.

Preferably, the first section extends upwardly at approximately 90 degrees with respect to the main deck of the vessel. This allows the tower to lay pipeline to the greatest depth possible. It also allows the vessel to be able to weathervane, as described later.

Preferably, the tower comprises a hydraulic ram for moving the upper section relative to the lower section. The hydraulic ram provides a safe and simple way of lowering and raising the upper section of the tower.

Preferably, the tower comprises locking pins for securing the upper section in position with respect to the lower section. The locking pins ensure that the upper section does not move in relation to the lower section when it is not intended to do so.

Preferably, the first lower section of the tower comprises a first lower part extending upwardly from a proximal end to a distal end above the main deck of the vessel, and a second upper part extending upwardly from the distal end of the first lower part and movably mounted on the first lower part, wherein the first lower section of the tower has a first pipe-laying configuration for laying pipeline in which the upper part is positioned above the lower part and pipe is passed from the upper part to the lower part when, in use, it is being laid, and a second low-height configuration in which the upper part is moved relative to the lower part and the overall height of the lower section of the tower is reduced.

Having an upper part of the lower section able to move relative to a lower part of the lower section allows the pipe-laying tower to have a low-height configuration where the overall height of the tower is reduced further than for the stowed configuration. By reducing the overall height of the tower further, the vessel is able to pass under more bridges. The low-height configuration is intended to be used exceptionally only to pass obstructions such as bridges.

More preferably, the height of the tower can be reduced so that in the low-height configuration the height of the vessel from the bottom of its keel line is less than 70 m, preferably approximately 67 m. This allows the vessel to meet the height requirement to pass through the Panama Canal (under Balboa bridge) or under Bosphorus bridge, for example.

More preferably, a first end of the second upper part is pivotally connected to the distal end of the first lower part to enable the tower to be converted between the first pipe-laying configuration and the second low-height configuration. Having the upper part pivotally connected to the lower part allows the tower to be converted in and out of the low-height configuration by a pivoting motion. It could be effected by the same means as used for the stowed configuration.

Preferably, when the tower is in the second low-height configuration, the upper section of the tower is aligned with the second upper part of the lower section of the tower. This allows the second section and the upper part of the lower section to be locked in relation to each other and therefore, effectively only one part/section of the tower has to be moved.

Preferably, the upper section of the tower and the second upper part of the lower section of the tower are approximately parallel to the main deck of the vessel in the second low-height configuration. This provides the maximum reduction in overall height of the vessel. Preferably, the upper section of the tower and the second upper part of the lower section of the tower are approximately at 90 degrees to the lower part of the lower section of the tower in the second low-height configuration.

Preferably, the lower section of the tower comprises a hydraulic ram for moving the upper part relative to the lower part. The hydraulic ram provides a safe and simple way of lowering and raising the upper section and lower part of the tower.

Preferably, the lower section of the tower comprises locking pins for securing the upper part of the lower section in position with respect to the lower part of the lower section. The locking pins ensure that the upper part does not move in relation to the lower part when it is not intended to do so.

Preferably, the tower comprises a travelling clamp wherein its travel path along the tower is limited to the lower section of the tower. This means that the tower can be converted to the stowed configuration independently of the position of the travelling clamp. Preferably, the travelling clamp is raised and lowered along its travel path by a winch system.

More preferably, the tower comprises a winch system for effecting movement of the travelling clamp, the winch system comprising an upper pulley wheel and a cable connected to the travelling clamp and passed over the upper pulley wheel, wherein the upper pulley wheel is moveable from the upper part of the lower section of the tower to the lower part of the lower section of the tower such that the upper pulley wheel can be moved to the lower part of the lower section of the tower when the tower is configured into the low-height configuration. This allows the tower to be easily converted into the low-height configuration. The winch of the winch system may be provided on the tower or elsewhere on the vessel.

Preferably, the height of the lower part of the lower section from the bottom of the keel line is approximately 60 m. When the tower is in the low-height configuration, the overall height of the vessel also includes the width of the upper part of the lower section (as it is pivoted to be at 90 degrees to the lower part). Hence, the height of the vessel in the low height configuration would be 67 m.

Preferably, the height of the upper part of the lower section is approximately 16 m. In one example, when the tower is in the stowed configuration, the overall height of the vessel includes the height of the lower part and upper part of the lower section and the height of the welding station on top of the upper part. The welding station has a typical height of 5.5 m. Hence, the height of the vessel in the stowed configuration in this example would be 81.5 m (60 m+16 m+5.5 m).

Preferably, the height of the upper section of the tower is approximately 49 m. Hence, the height of the vessel in the pipe-laying configuration in this example would be 125 m (60 m+16 m+49 m).

The pipe-laying tower is preferably fixed in a substantially vertical position during laying operations.

Preferably, the pipe-laying vessel also comprises a separate pipestring elevator for rotating a pipestring from a substantially horizontal orientation at the base of the tower to an orientation substantially parallel to the tower.

According to a second aspect of the invention there is also provided a pipe-laying vessel including a pipe-laying tower extending upwardly above the main deck of the vessel, the vessel also comprising a pipestring elevator for rotating a pipestring from a substantially horizontal orientation at the base of the tower to an orientation substantially parallel to the tower, and wherein the pipestring elevator is mountable for movement along the tower such that the pipestring elevator can rotate the pipestring to be substantially parallel to the tower and then lift the pipestring up the tower.

This allows the pipe-string to be lifted up the tower by the same equipment that rotates the pipe-string to be parallel to the tower. This makes loading of the pipestrings on the tower more efficient.

Preferably, the pipestring elevator is in the form of a strongback such that in the rotation stage, the pipestring elevator is simultaneously translated towards the tower whilst a first end of the pipestring elevator nearest to the tower is lifted up the tower.

More preferably, the pipestring elevator is mountable at its first end such that as the first end is moved up the tower from the base of the tower to a height up the tower corresponding to the length of the pipestring, the pipestring is rotated to be substantially parallel to the tower and then when the first end is moved further up the tower, the pipestring is lifted up the tower. This enables the pipe-string to be both rotated and lifted by the action of moving the first end of the pipe-string elevator up the tower.

Preferably, the first end of the pipestring elevator is moved further up the tower by a distance of at least half the length of a pipestring. More preferably, the first end of the pipestring elevator is moved further up the tower by a distance of approximately the length of a pipestring.

More preferably, the first end of the pipestring elevator is mountable on a winch system such that the first end can be pulled up the tower.

Preferably, the first end is mountable in a guide mechanism so that the first end can be guided as it moves up the tower.

Preferably, a second end of the pipestring elevator is mountable in a guide mechanism along the deck of the vessel so that the second end can be guided as the pipestring elevator is rotated.

More preferably, the second end guide mechanism is joined to the first end guide mechanism so that the second end is guided by the second end guide mechanism along the deck of the vessel to the base of the tower and then by the first end guide mechanism up the tower. This allows the second end to be continually guided as the pipe-string is both rotated and then lifted up the tower.

Preferably, the pipestring elevator comprises a stopper at its second end so when the pipestring elevator is lifting a pipestring up the tower, the stopper provides an abutment for the pipestring and takes a significant proportion, and more preferably substantially all, of the weight of the pipestring.

Preferably, the pipestring elevator is provided with one or more clamps for holding a pipestring. More preferably, these pipestring elevator clamps are designed so that they cannot be opened at the same time as one or more clamps on the tower for holding the pipestring. This prevents a pipestring from being dropped from the tower. Preferably, the pipestring elevator clamps and/or the clamps on the tower are controlled by hydraulic fluid. More preferably, the pipestring elevator clamps and/or the clamps on the tower are designed so that in a natural state (for example, when there is a loss of power to valves in the hydraulic fluid circuit), they remain closed.

According to a third aspect of the invention there is also provided a pipe-laying vessel including a pipe-laying tower extending upwardly from the vessel, the tower comprising a hang off clamp assembly provided at a lower region of the tower for clamping pipeline that has been deployed from the vessel, a travelling clamp with a travel path along a length of the tower for laying pipeline, a first lower section extending upwardly from a proximal end to a distal end above the main deck of the vessel, and a second upper section extending upwardly from the first lower section and having a length that is at least one third of the length of the lower section, wherein the travel path of the travelling clamp is limited to the lower section of the tower.

It should be understood that in the third aspect of the invention, the second upper section of the tower is preferably movably mounted on the first lower section of the tower but it is within the scope of the third aspect of the invention for the first and second sections of the tower to be integral with one another. The preferred arrangement provides for a construction in which the upper section of the tower can be moved in relation to the lower section of the tower independently of the position of the travelling clamp.

Preferably, the travelling clamp is raised and lowered along its travel path by a winch system.

Preferably, the tower comprises a further clamp located above the travel path of the travelling clamp on the upper section of the tower. This further clamp allows a pipe-string to be clamped above the travel path of the travelling clamp, for example, on the upper section of the tower.

Preferably, the tower comprises three line-up clamps located on the upper section of the tower. This allows a pipe-string to be lined up above the travel path of the travelling clamp, for example, on the upper section of the tower.

More preferably, one of the line-up clamps is a friction clamp.

Preferably, a further clamp is located on the lower section of the tower. This allows a pipestring or the end of a pipeline on the lower section of the tower to be held in a desired position, for example, on the travel path of the travelling clamp.

More preferably, a second further clamp is located on the lower section of the tower. The second further clamp can provide a further holding of the pipestring or the end of the pipeline.

Preferably, the hang off clamp assembly is a fixed clamp assembly comprising a friction clamp and a collar clamp.

The hang off clamp assembly may comprise a further clamp, for example, a safety clamp.

The tower is preferably of an overall length sufficient to accommodate two pipe strings end to end. A working station is preferably provided partway up the tower, preferably in the region of the top of the lower section of the tower. It is also preferred that a working station is provided in the region of the bottom of the tower. In an embodiment of the invention described below, there is a working station in the region of the bottom of the tower and another working station partway up the tower. A working station is a station at which the pipeline being formed can be welded and/or coated and/or inspected.

In a case where two working stations are provided, they are preferably spaced apart by the length of a pipestring. It is then possible for a junction of two pipestrings to be inspected or worked on at one working station while another junction is inspected or worked on at another working station. The working stations are preferably manned.

In a case where the tower comprises a first lower section and a second upper section, there is preferably a working station in the region of the top of the first lower section.

According to a fourth aspect of the invention there is also provided a method of laying a pipeline on a seabed from a pipe-laying vessel, the method comprising the following steps laying pipeline from a substantially vertical pipe-laying tower, passing the pipeline through guides as it leaves the vessel to control curvature of the pipeline, the pipeline leaving the guides at an inclination to the vessel, with the horizontal component of the inclination approximately parallel to the path of the pipeline laid on the seabed, adjusting the orientation of the vessel according to the sea conditions such that the longitudinal axis of the vessel is inclined to the path of the pipeline on the seabed and to the horizontal component of the path of the pipeline as it leaves the guides, and driving the vessel in a direction substantially parallel to the path of the pipeline laid on the seabed.

Usually, when J-laying pipeline from a vessel, the vessel has to be orientated in a direction such that its longitudinal axis is substantially aligned with the path of the pipeline laid on the seabed and is propelled in the direction in which it is heading. That exposes the vessel to wind or swell that is coming from one side and that, if there were not pipe-laying considerations, the vessel would wish to head into. In accordance with embodiments of the fourth aspect of the invention, however, the vessel is orientated such that its longitudinal axis is inclined to the path of the pipeline laid on the seabed to take account of wind, swell or other sea conditions. Despite that inclination, the pipeline is still guided to leave the vessel along a path whose horizontal component is approximately parallel with the path of the pipeline laid on the seabed. That is achieved by providing a substantially vertical pipe-laying tower and allowing the pipeline to curve in any of a range of directions as it leaves the tower. Also the vessel is preferably provided with a propulsion system that is able to propel the vessel in a direction that is inclined to its longitudinal axis.

The pipe-laying tower is preferably fixed in a substantially vertical position, but it is within the scope of the invention for it to be of adjustable inclination. Preferably, the guides through which the pipeline passes as it leaves the vessel surround the pipeline on all sides and are preferably able to be effective around all 360 degrees of the pipeline.

The preferred inclination of the longitudinal axis of the vessel to the path of the pipeline is dependent upon sea and weather conditions, but may be substantial. For example it may be more than 20 degrees or even more than 45 degrees.

According to a fifth aspect of the invention there is also provided a pipe-laying vessel including pipe-laying apparatus for S-laying a pipeline from the vessel, wherein the vessel further includes a pipe-laying tower for J-laying a pipeline from the vessel, the pipe-laying tower being positioned partway along the length of the vessel between the upstream and downstream portions of the S-lay pipe-laying path. Such a vessel is able to perform both S-laying and J-laying of a pipeline and so is able to lay pipeline in a variety of depths of water. The upstream portion of the S-lay pipe-laying path may be substantially horizontal and the downstream portion may be downwardly inclined. The downstream portion may enter the water at a location inboard of a first end of the vessel. The pipe-laying tower may be positioned between the upstream portion of the S-lay pipe-laying path and the location at which the S-lay pipe-laying path enters the water.

Preferably, the pipe-laying tower extends upwardly at a fixed angle of approximately 90 degrees with respect to a main deck of the vessel. This allows the tower to lay pipeline to the greatest depth possible. It also allows the vessel to weathervane, as the J-laid pipeline leaves the vessel vertically.

Preferably, the pipe-laying tower is positioned to one side of the centre-line of the vessel. This allows the S-laying apparatus to be positioned along the centre-line of the vessel.

Preferably, the vessel hull includes an opening to allow pipeline from the pipe-laying tower to enter the water through a moonpool.

Preferably, the pipe-laying vessel is a monohull vessel.

Preferably, the pipe-laying tower is positioned in the middle third of the length of the vessel.

Preferably, the pipe-laying vessel comprises an abandonment and recovery system, wherein the abandonment and recovery system can be used with both the S-laying apparatus and the J-laying tower. This means that only one, common abandonment and recovery system needs to be installed on the vessel. This means that only one power unit, for example, a hydraulic power unit, need be installed. This saves weight and space on the vessel.

According to a sixth aspect of the invention there is also provided a method of laying pipeline including S-laying a part of the pipeline from a vessel, and J-laying another part of the pipeline from a pipe-laying tower on the vessel, wherein the pipe-laying tower is positioned partway along the length of the vessel between the upstream and downstream portions of the S-lay pipe-laying path. This method allows a pipeline to be laid in a variety of depths of water.

During S-laying, the pipe-laying path may include an upstream portion that is substantially horizontal and a downstream portion that is downwardly inclined. The downstream portion may enter the water at a location inboard of a first end of the vessel.

The pipe-laying tower may be positioned partway along the length of the vessel, preferably between the upstream and downstream portions of the S-lay pipe-laying path.

In any of the aspects of the invention described above, preferably the pipe-laying tower is capable of accommodating a tension in the pipeline being laid of 2000 tonnes, and more preferably capable of accommodating a tension in the pipeline being laid of more than 2000 tonnes.

In any of the aspects of the invention described above, preferably the tower includes a first lower section extending upwardly from a proximal end to a distal end above the main deck of the vessel and a second upper section mounted on the first lower section and wherein the tension in the pipeline being laid is taken by the lower section, and not by the upper section. This means that the upper section can be designed to take less load than the lower section and can therefore have a lighter construction.

Preferably, the proximal end of the first section is an integral part of the body of the vessel.

The friction line-up clamp located above the travel path of the travelling clamp on the upper section of the tower is described and claimed in UK patent application entitled "Clamp Assembly for Pipe-laying Vessel and Method of Laying a Pipeline" with agent's reference "P015338 GB", having the same filing date as the present application. The contents of that application are fully incorporated herein by reference. The claims of the present application may incorporate any of the features disclosed in that patent application. In particular, the claims of the present application may be amended to include features relating to the line-up clamp.

It will of course be appreciated that features described in relation to one aspect of the present invention may be incorporated into other aspects of the present invention. For example, the features of the first, second and third aspects of the invention can all be combined and indeed are combined in a vessel embodying the invention and described below, and the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3 shows a perspective view of the string elevator, on the deck of the vessel of FIG. 1;

DETAILED DESCRIPTION

Figure 1:
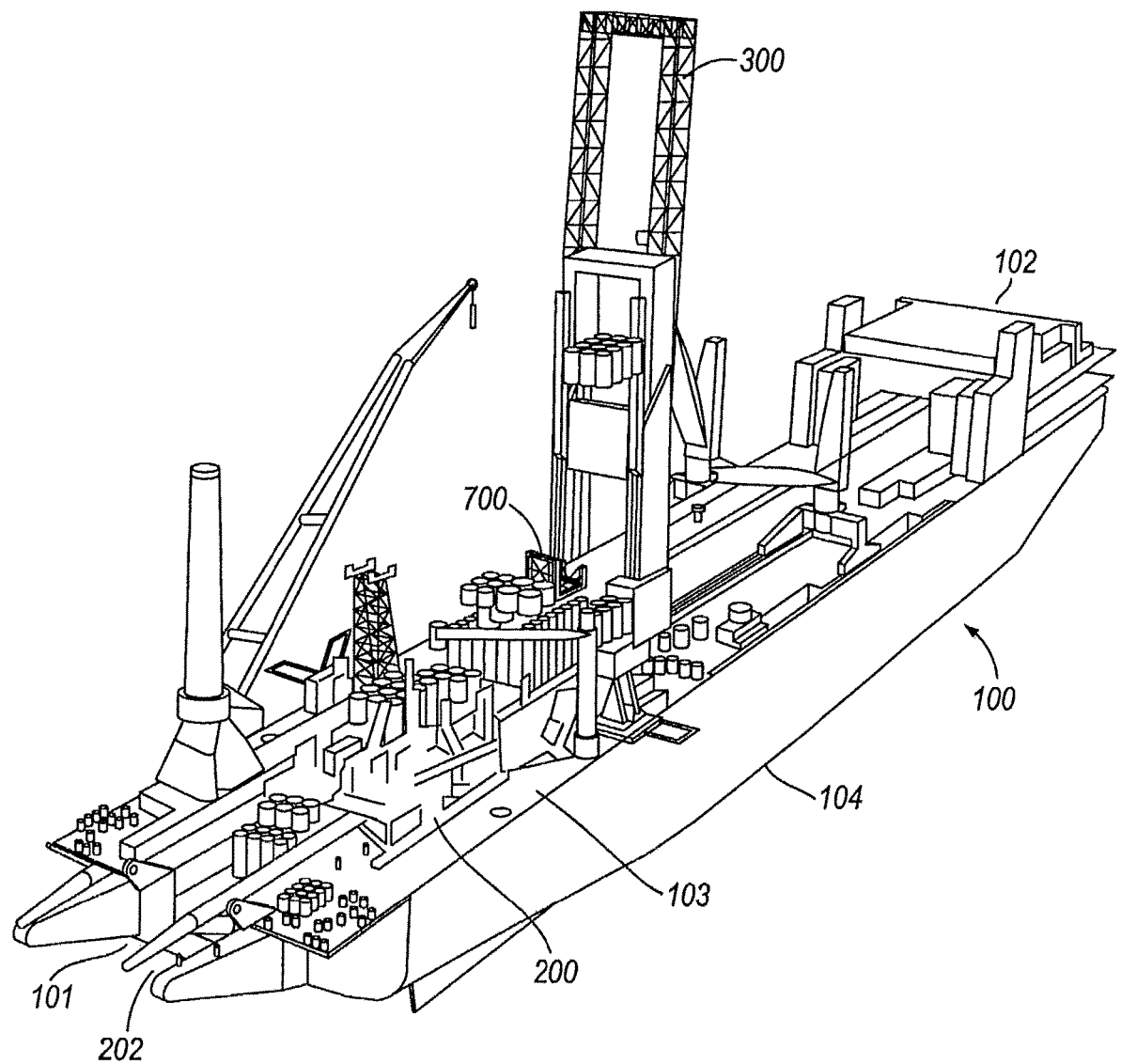
FIG. 1 shows a perspective view of a vessel according to an embodiment of the invention.

FIG. 1 shows a pipe-laying vessel 100. The vessel 100 has a bow end 102 and a stern end 101. The bottom of the vessel, known as the keel line, is labelled as 104. On the deck 103 of the vessel, at the stern end 101 are various ramps defining S-laying apparatus 200. Other S laying apparatus is provided towards the bow of the vessel as more fully described in WO2008/107186, the contents of which is incorporated herein by reference. At the stern end 101 is an S-lay opening 202 to allow the pipeline to enter the water near the stern of the vessel 100. The vessel 100 also has a J-laying tower 300 in a middle portion of the vessel partway along the firing line for S-laying.

Figure 2A:
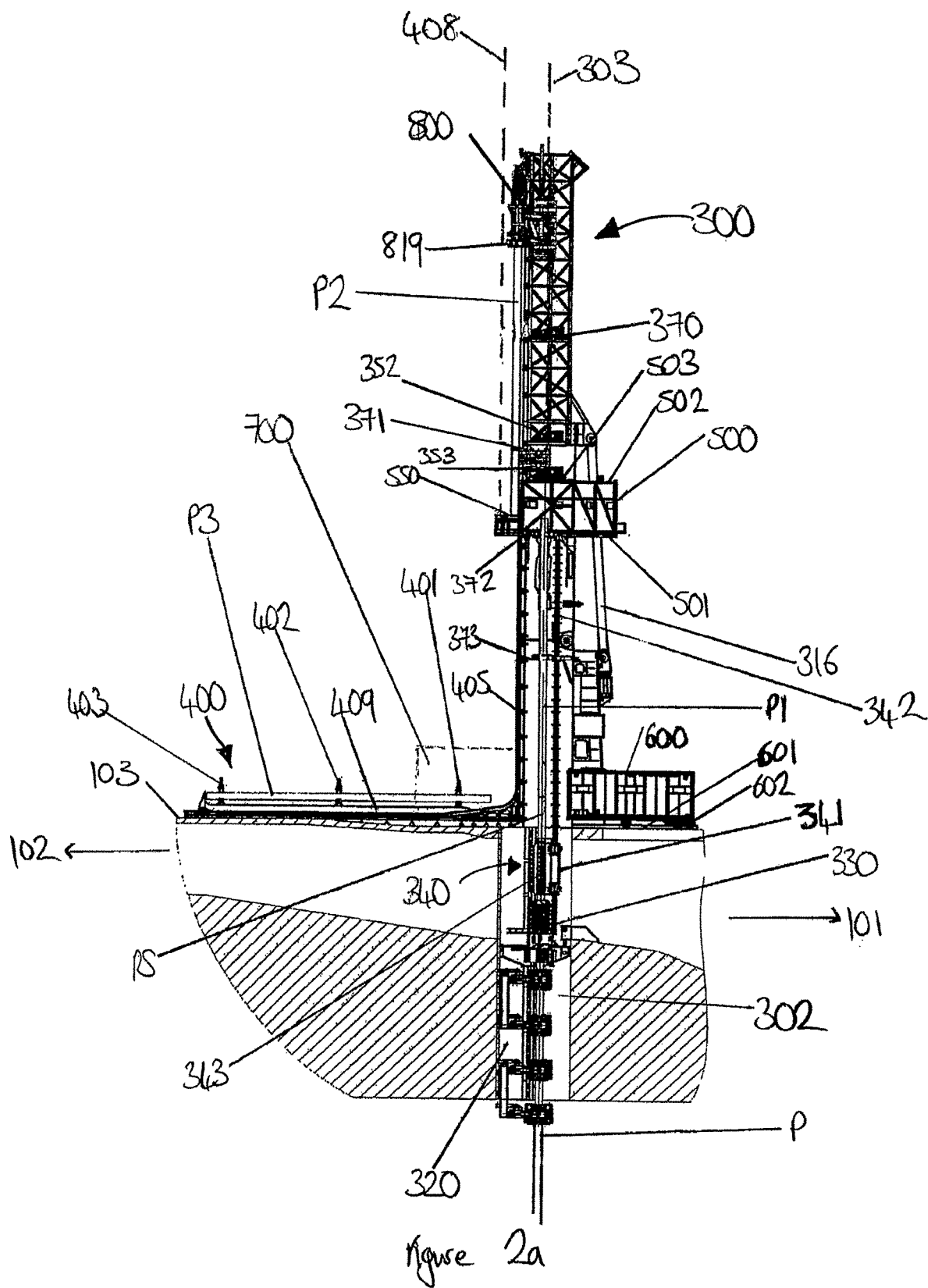
FIG. 2*a* shows a side view of the pipe-laying tower in an initial state, on the vessel of FIG. 1.
Figure 2B:
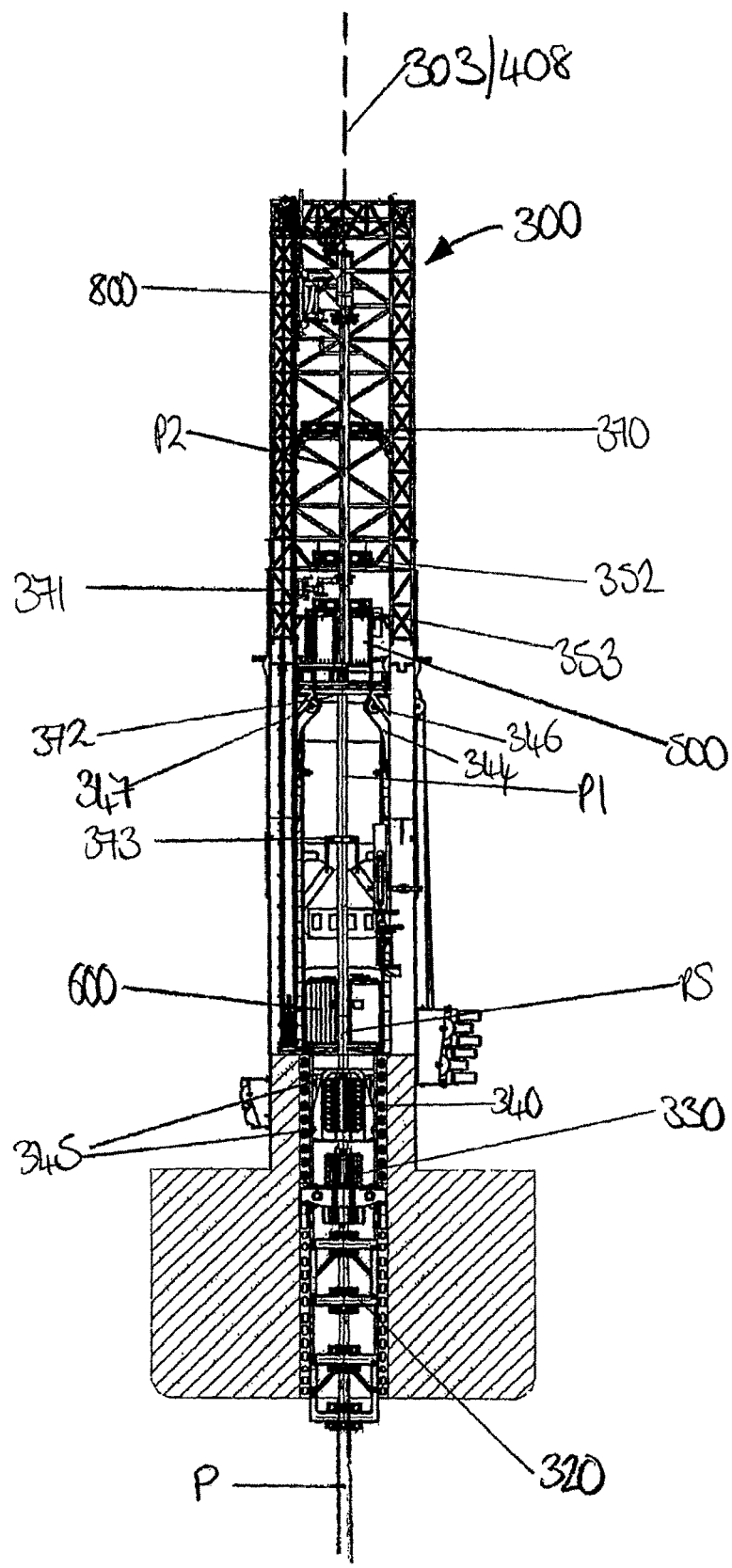
FIG. 2*b* shows a front view of the pipe-laying tower, also in an initial state.

FIGS. 2a and 2b show more detailed views of the J-lay tower 300 and associated equipment. The tower 300 extends upwards vertically from the deck 103 of the vessel.

Below the tower is an opening 302 in the hull of the vessel to the water beneath. This opening allows passage of the pipeline P from the tower 300 to the water.

In the following description, the pipeline comprises a deployed pipeline (where the pipeline in question comprises pipestrings that have been welded together and substantially deployed off the vessel 100 below the keel 104 of the vessel 100). This deployed pipeline is labelled as P. The pipeline also comprises a pipeline that has not been deployed yet and is still held on the vessel 100. This pipeline comprises a series of pipestrings PS, P1, P2, P3 which are already or will be welded together and then deployed in due course.

In particular, PS is the pipestring already welded at its bottom end to the deployed pipeline P. Hence, pipestring PS is partly deployed below the keel 104 and partly still on the vessel 100. P1 is the pipestring welded to the top end of PS and held in a lower section 310 of the tower, P2 is the pipestring that is being held in an upper section 311 of the tower and will be welded to the top of P1 in due course and P3 is the pipestring currently in a string elevator, which will be welded to the top of P2 in due course.

Attached to the side of the opening 302 is a flute 320 (sometimes called a J-stinger) which controls orientation of the pipeline P as it enters the water. The flute 320 has various rollers to guide the pipeline P. These rollers are removable when S-laying. The rollers are also moveable up and down in the flute. The flute 320 also acts to prevent any lateral forces applied to the vessel by the pipeline P being transferred to a hang off clamp assembly 330 above it.

Above the flute 320 and still below the deck 103, is a hang off clamp assembly 330, which will be described in more detail in relation to FIG. 6. The hang off clamp assembly 330 is located close to the flute 320. The hang off clamp assembly 330 is located just above the sea water level.

Above the hang off clamp assembly 330 is a travelling clamp assembly 340, mounted on two rails 342. The rails 342 extend from above the hang off clamp assembly 330, upwards through the opening 302, passing through the deck 103 of the vessel 100 and upwards through the J-lay tower 300 to just below a welding station 500 located on the tower 300 at about mid-height.

The travelling clamp assembly 340 comprises a friction clamp 343 mounted on a trolley 341 on the rails 342. The trolley 341 comprises four shoes 345 (one at each corner) which are made up of wheels and act as lateral guides to guide the travelling clamp assembly 340 up the rails 342. At the top of each rail is an upper sheave block 344 with a pulley wheel 346. The travelling clamp assembly 340 can be moved up and down the rails 342 by the use of cables 347 extending up, over these pulley wheels and attached to the travelling clamp assembly 340. Each upper sheave block 344 can be slid up and down the rails 342 so that the cables 347 on the pulley wheels 346 are retracted down the tower 300 to a lower part 312 of the lower section 310. This ensures that these cables 347 are below a pivot point of the tower when it is converted into a low-height/bridge passage configuration (as will be described in more detail later in relation to FIG. 14c).

The friction clamp 343 is lined up so that it is along the length of the pipe-laying path or axis 303. The rails 342 extend parallel to this pipe-laying axis 303. The friction clamp 343 has two front doors (not shown) that can open to allow a pipestring containing a bulky item to be introduced into the clamp. In addition, the friction clamp 343 is mounted to the trolley 341 by means of elastic mounts to allow an oscillation of +/−1 degree during bulky item introduction.

On the deck 103 of the vessel, to one side of the tower 300 is a coating station 600. The coating station 600 is mounted on rollers 602 which run on track 601 in the deck 103 to allow the coating station 600 to be moved between a position adjacent the base of the tower 300 (a working position) and a position slightly removed from the base of the tower (a storage position). This allows the travelling clamp assembly 340 to pass by the coating station 600 and also allows bulky items to pass by. The coating station 600 takes no longer than 20 seconds to travel between its storage position and its working position.

The coating station 600 is separate from, and at a different height to, the welding station 500. This allows a pipestring to be coated as it passes through the coating station 600 (i.e. as the pipeline P is being laid by the travelling clamp assembly 330) after it has been welded to the pipestring above. The coating and welding steps can take place independently and in parallel. The coating station 600 can also perform non-destructive tests (NDT) on the pipeline P and, if necessary, repair or replace any defective welds.

Figure 7:
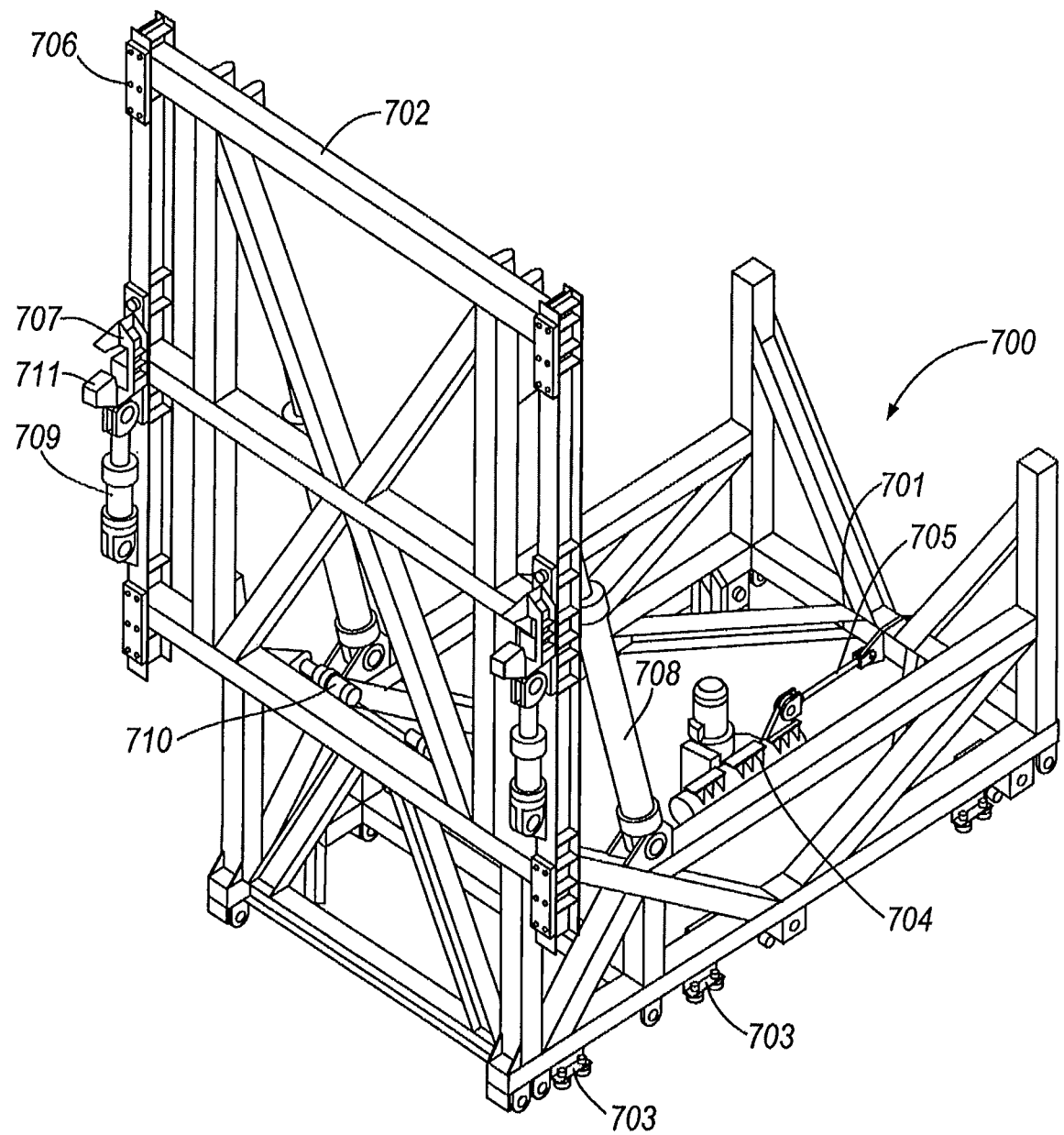
FIG. 7 shows a perspective view of a bulky item handling skid.

On the other side of the tower 300, is a bulky item handling skid 700, which will be descried in more detail in relation to FIG. 7.

Also on that other side of the tower 300 is a string elevator 400. The string elevator is mounted on rails 405 which extend from the base of the tower 300, along the deck 103 of the vessel so that the string elevator can be accommodated horizontally on the deck 103 of the vessel. The rails 405 also extend up substantially the whole length of that side of the tower 300. The string elevator 400 holds a pipe-string P3 made up of 3 joints (3J). When the string elevator 400 is raised up the tower 300 on the rail 405, the pipe-string P3 is lined up with a string axis 408, which is parallel to the pipe-laying axis 303. The string elevator will be described in more detail in relation to FIG. 3.

Various clamps and other laying equipment are located along the length of the tower 300 as will now be described.

Figure 4A:
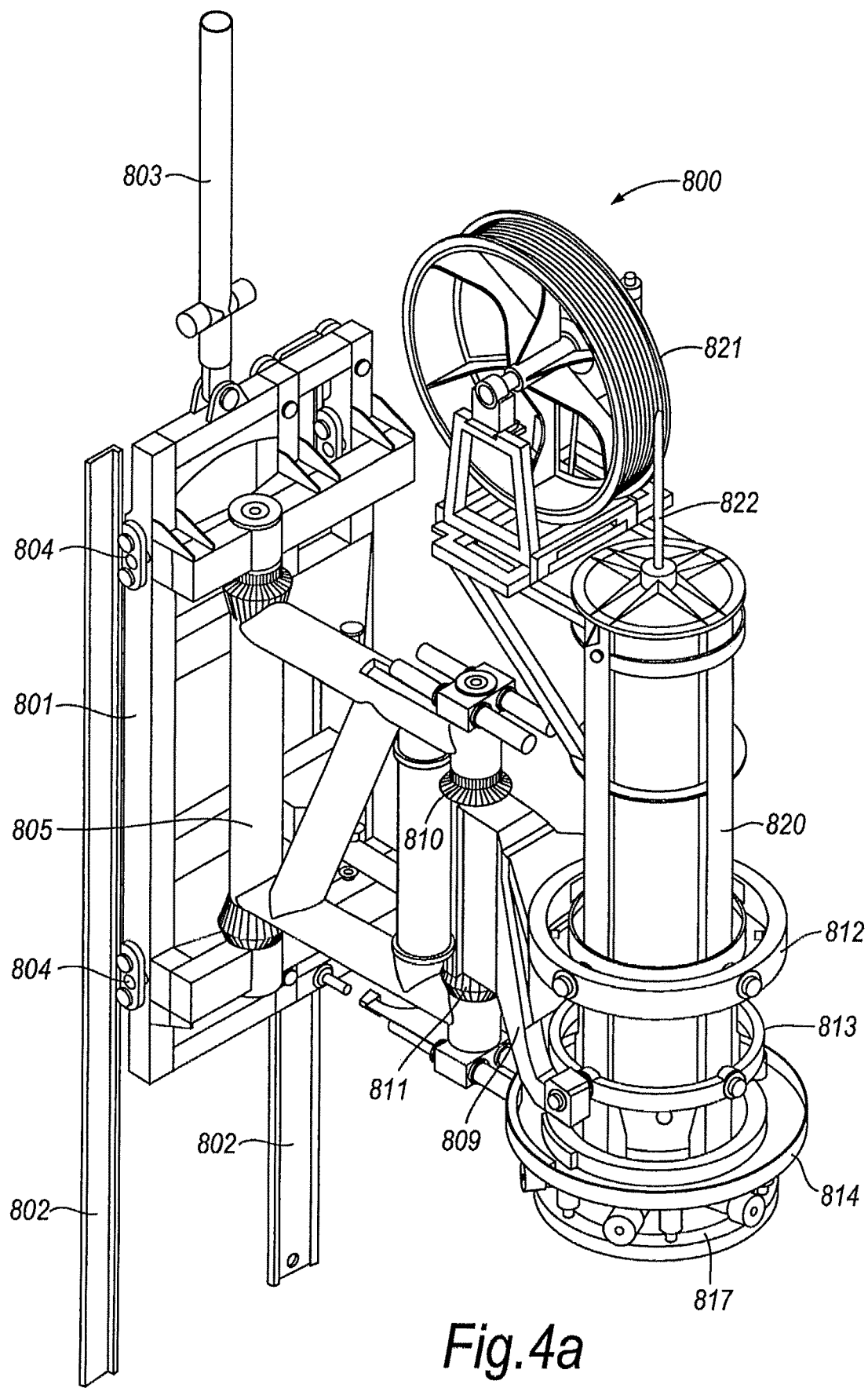
FIG. 4*a* shows a perspective view of a tower clamp assembly.
Figure 4B:
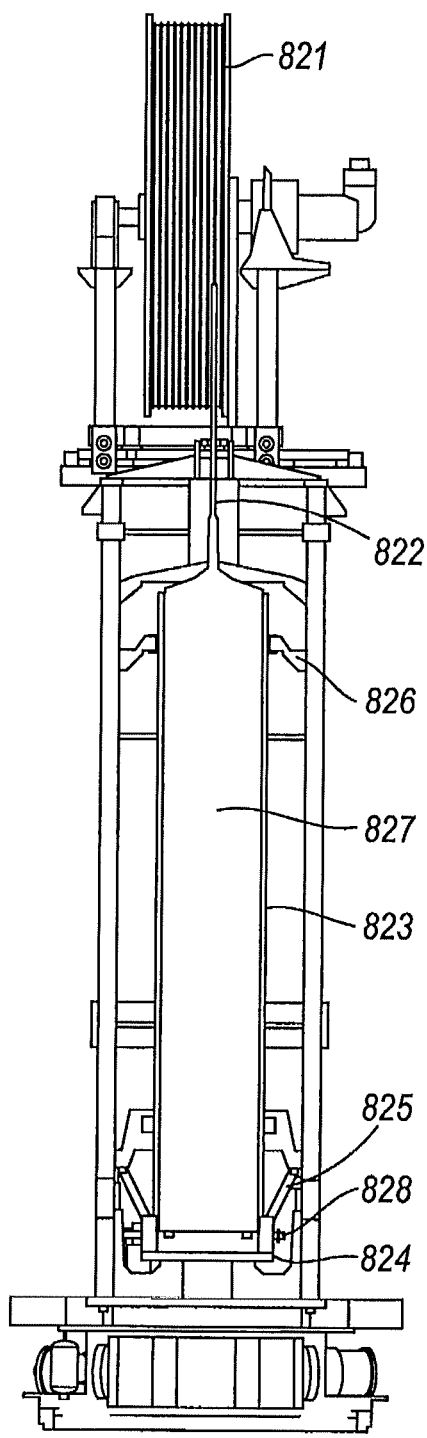
FIG. 4*b* shows a front view of the tower clamp assembly.
Figure 4C:
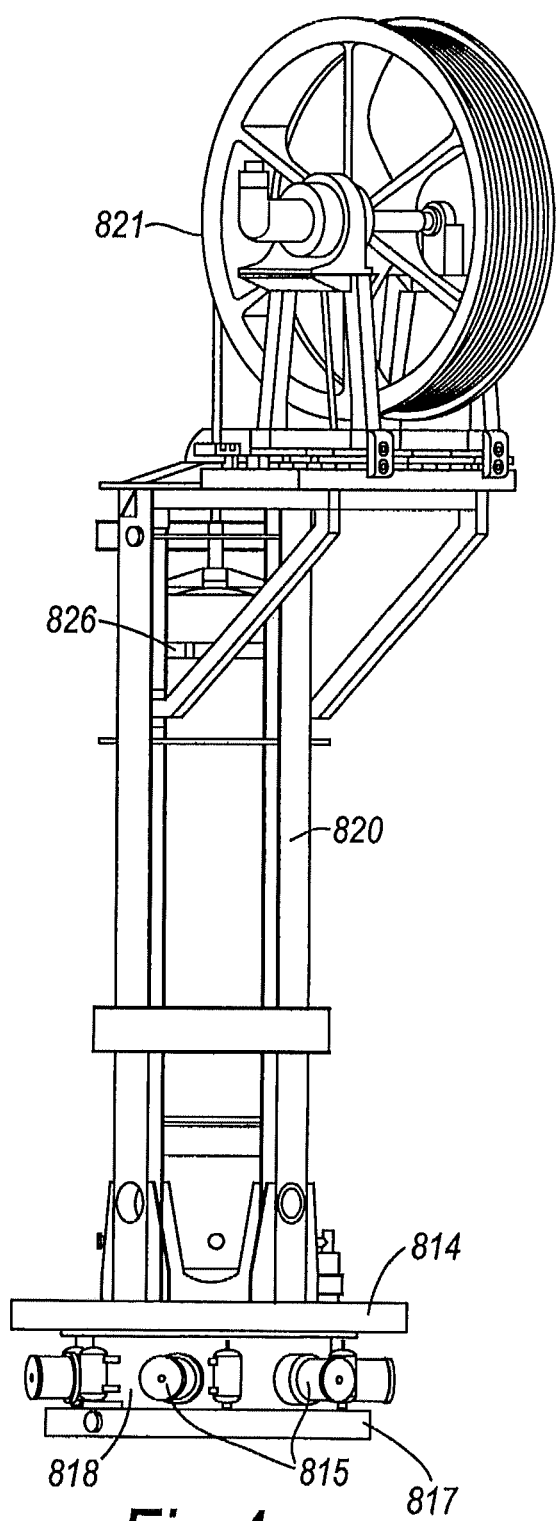
FIG. 4*c* shows a side view of the tower clamp assembly.

Starting from the top of the tower, there is located a tower clamp assembly 800, including an articulated friction line-up clamp 819. The tower clamp assembly 800 is pivotable so as to move a pipe-string from the string axis 408 to the pipe-laying axis 303. In FIGS. 2a and 2b, the tower clamp assembly is shown clamping a pipestring P2 at one side of the tower 300 in between the string axis 408 and the pipe-laying axis 303. The tower clamp assembly 800 will be described in more detail in relation to FIGS. 4a to 4c.

A tower arm 371 is located further down the tower, above the height of the welding station 500. The tower arm 371 is articulated (with a first and second arm) in the same way as the friction line-up clamp 819 of the tower clamp assembly 800. Hence, as the friction line-up clamp 819 transfers a top end of the pipestring P3 from the string axis 408 to the pipe-laying axis 303, the tower arm 371 is controlled in the same way to guide a bottom portion of the pipestring P3. This way the pipestring P3 stays vertical and can be lined up with the pipe-laying axis 303.

A tower roller 370 is located about halfway between the tower clamp assembly 800 and the tower arm 371 and is located on the pipe-laying axis 303. The tower roller 370 can be opened or closed around a pipestring P2 on the pipe-laying axis 303.

Figure 5A:
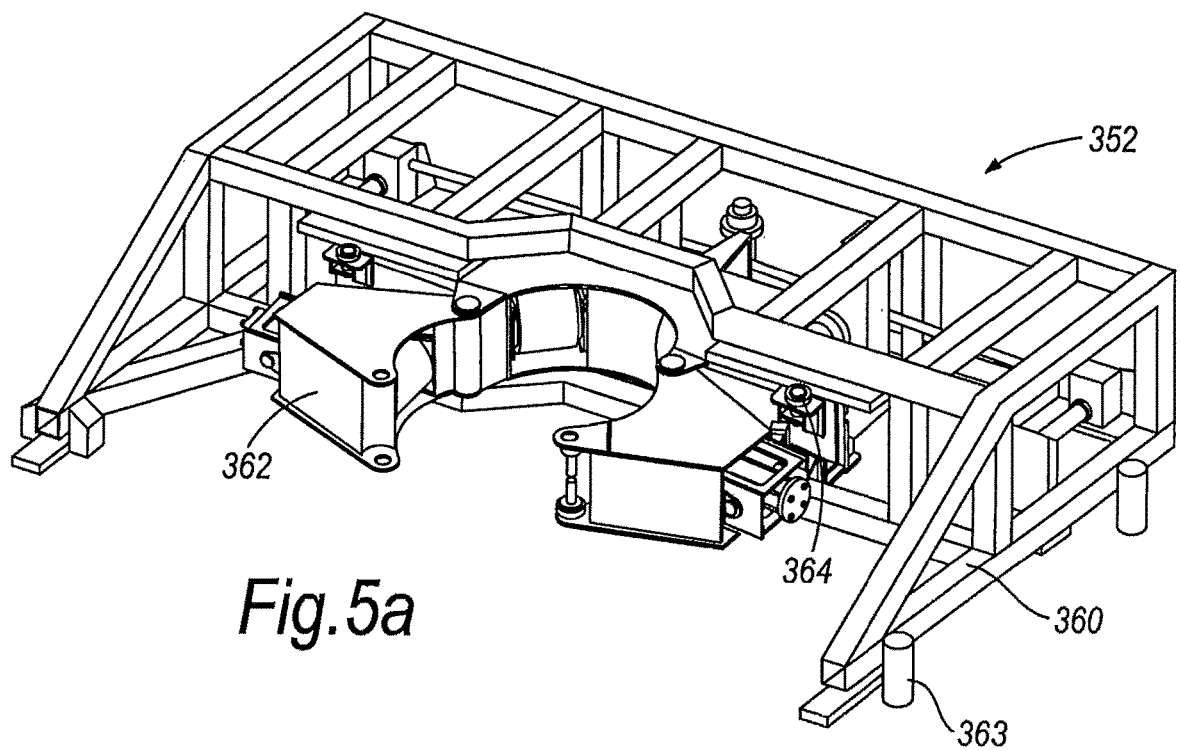
FIG. 5a shows a perspective view of a tower clamp mechanism.
Figure 5B:
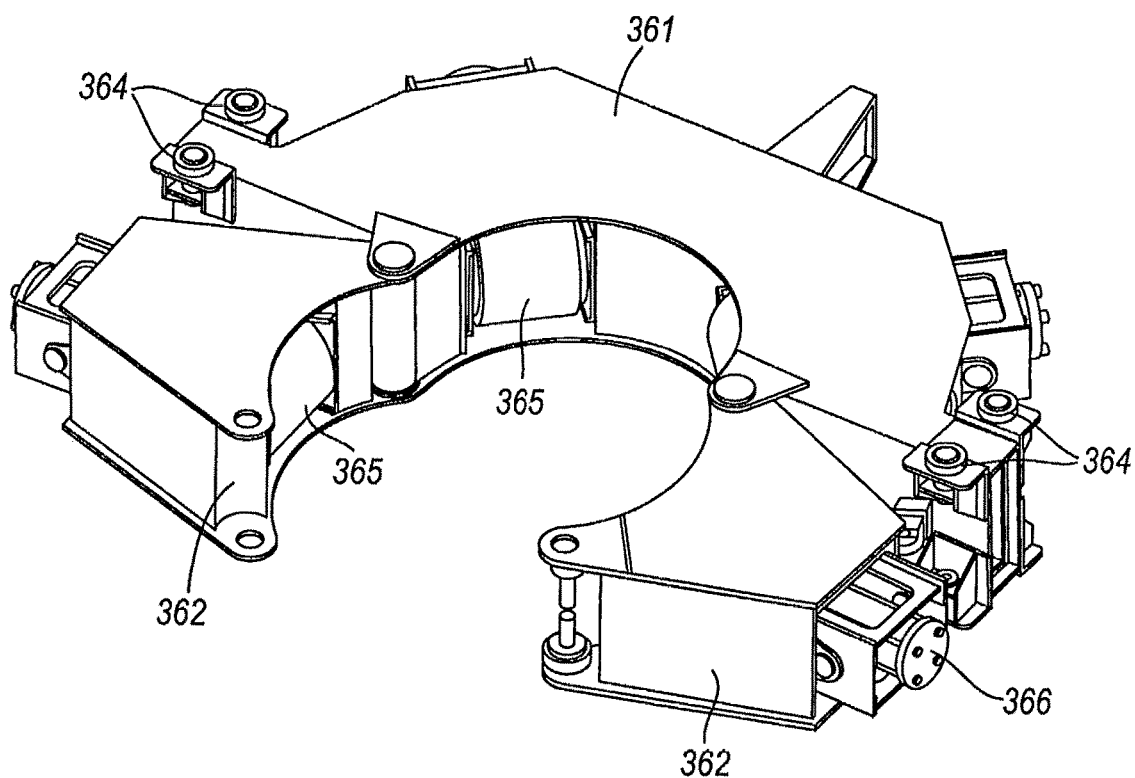
FIG. 5b shows a perspective view of part of the tower clamp mechanism.

A line-up clamp mechanism 352 is provided above the tower arm 371 and is described in more detail in relation to FIGS. 5a and 5b.

The welding station 500 is provided with a roof 502 with a turntable 503 on the roof 502. The turntable 503 is provided with a central pipe opening (not shown). Hence, the turntable allows a weld joint to be provided all the way round the circumference of the pipe strings.

This station welds the pipestring above it (for example P2) to the pipestring below it (for example, P1) which, by then, may be regarded as the upper end of the pipeline P. The welding station 500 also carries out non-destructive test (NDT) to check the pipestrings.

A line-up clamp mechanism 353 is provided on the roof 502 of the welding station 500. This line-up clamp mechanism 353 is identical to the line-up clamp mechanism 352 higher up the tower 300.

The welding station 500 is provided with a safety balcony 550 extending out from the welding station to under the string axis 408. The safety balcony 550 prevents the pipestring (P2) from falling down, while being transferred from the string axis 408 to the pipe-laying axis 303.

Underneath the floor 501 of the welding station 500 is another clamp 372. This clamp 372 acts to keep the pipeline P, including the previously welded pipestring P1, in the lower section 310 of the tower in position.

A similar clamp 373 is also provided in the lower section 310 of the tower. This clamp 373 is located towards the top of the lower part 312 of the lower section 310 of the tower. This clamp is mounted on a tiltable base so that it can be tilted into and out of the pipe-laying axis 303. As the clamp 372 can be moved out of the pipe-laying axis 303, this allows for the travelling clamp assembly 340 to travel up and down on the pipe-laying axis 303 and pass this clamp 373.

FIG. 2a also shows a pivoted hydraulic ram 316 that is used to collapse the tower 300 into transit and bridge-passage configurations. This will be described in more detail in relation to FIGS. 14a to 14c.

Figure 2C:
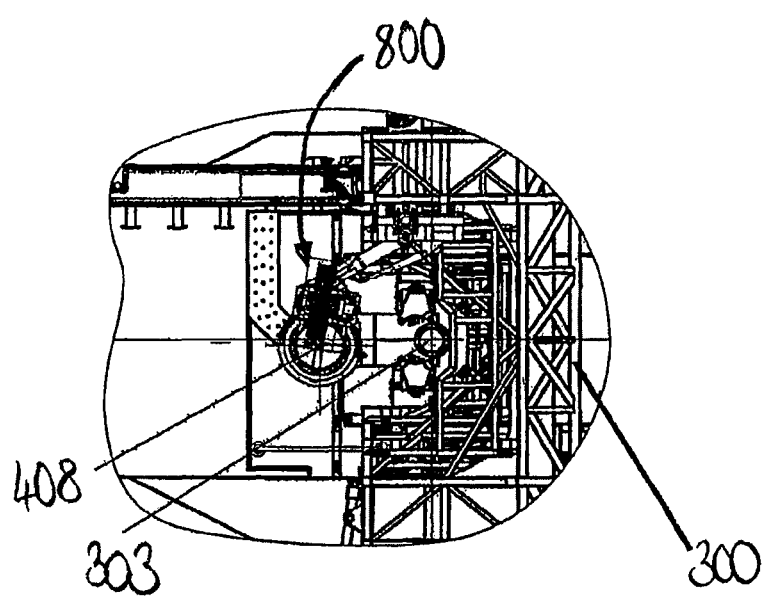
FIG. 2*c* shows a top view of part of the tower, also in an initial state.

FIG. 2c shows a plan view of the tower clamp assembly 800 holding a pipestring on the string axis 408. The figure also shows the position of the pipe-laying axis 303 of the tower 300.

FIG. 3 shows the string elevator 400 at the base of the tower 300. The string elevator comprises a main beam structure 409 with three clamps 401, 402, 403 distributed along the length of the beam 409. These clamps 401, 402, 403 hold a pipestring P3 on the string elevator. These clamps are fail-safe and are designed to remain closed in the absence of hydraulic power, for example. They are also designed not to open until a pipestring P3 is being gripped by the tower clamp assembly 800 and tower arm 371, as will be described later. These clamps are designed to take an axial load of 10% the weight of the heaviest pipestring to be used.

The string elevator is also provided with a shoe 404 at a second end furthest away from the tower 300. The shoe 404 provides permanent support for the pipestring P3 while on the string elevator 400 and is designed to take the weight of the heaviest pipestring to be used. The main beam structure 409 is mounted at its first end on a locomotion trolley 406. This locomotion trolley runs up and down the tower 300 on rails 405a. There are also further rails 405b that extend away from the base of the tower along the deck 103 of the vessel and provide a guide for a roller provided on the second end of the string elevator 400. Importantly, the rails 405b are curved at the region at the base of the tower 300 so as to provide support for the second end of the string elevator 400 in this region and prevent it getting wedged in the corner at the base of the tower.

FIGS. 4a, 4b, 4c and 4d show detailed views of the tower clamp assembly 800 at the top of the tower 300. The tower clamp assembly comprises a trolley 801 with rollers 804 on each of its four corners. The rollers 804 are engaged in two vertical parallel rails 802, to allow the trolley 801 to run up and down the rails 802 by +/−1800 mm. A hydraulic cylinder 803 is connected to the top of the trolley 801 to control movement of the trolley 801 on the rails 802. The hydraulic cylinder 803 also acts as a weight compensation system to accurately control the approach of the pipestring P2 to the pipeline P to which it is to be joined in the welding station 500.

A framework 805 is mounted on the trolley 801 so that it can pivot about a vertical axis. The framework 805 therefore acts as a first arm extending outwards horizontally from the trolley 801. The first arm 805 can be rotated with respect to the trolley 801 by two hydraulic cylinders (not shown). The framework 805 comprises a vertical end rod at a distal end, with a secondary arm 809 mounted on it. The secondary arm 809 comprises a sleeve portion which fits over the end rod to allow the secondary arm 809 to pivot about the vertical end rod. The secondary arm can be rotated with respect to the first arm 805 by two rotary actuators 810, 811 mounted on the end rod at either end of the sleeve.

The pivotally mounted first arm 805 and secondary arm 809 allow the distal end of the secondary arm 809 to be pivoted from the string axis 408 to the pipe-laying axis 303. This means that a pipestring P2 held by the tower clamp assembly 800 (as will be described later) can be transferred to the pipe-laying axis 303 from the string axis 408. It also allows the pipestring P2 to be lined up on the pipe-laying axis 303 with the pipeline P, to which it is to be joined, beneath it.

On the distal end of the secondary arm 809, is a mounting ring 813 with a vertically extending Internal Line-Up Clamp (ILUC) garage frame 820 within the mounting ring 813. The mounting ring 813 is pivotally mounted on the secondary arm 809 for pivotal movement about a first horizontal axis and the garage frame 820 is pivotally mounted on the mounting ring 813 for pivotal movement about a second horizontal axis perpendicular to the first horizontal axis. These two pivotal mountings thus define a Cardan joint allowing the garage frame 820 to pivot about a vertical axis in any direction. Pivoting is restricted to about three degrees by a restraining ring 812 fixed to the secondary arm 809. Furthermore retractable restraints are provided inside the ring 812, which when not retracted, prevent any pivoting of the garage frame 820. The garage frame 820 takes the form of an elongate cage. Within the cage is an ILUC guide 823 (FIG. 4b) in the form of an elongate tube extending along the longitudinal axis of the cage. The guide 823 has a diameter to correspond to an ILUC 827 contained in the guide 823. The guide 823 is attached to the inside of the cage by a gimbal joint 826. This gimbal joint 826 allows guide 823 to pivot slightly within the cage. At the bottom end of the guide 823 is a bevel protector 824. This bevel protector 824 is installed around the top of the pipestring P2 by 4 hydraulic cylinders 825.

In addition, also at the bottom of the guide 823 are four radial safety pins 828 that can be moved in and out to prevent an ILUC 827 from falling through the guide 823. As an additional/alternative safety mechanism, safety pins may be installed at a top end of the ILUC 827 to latch the ILUC on the top of the guide 823.

Figure 4D:
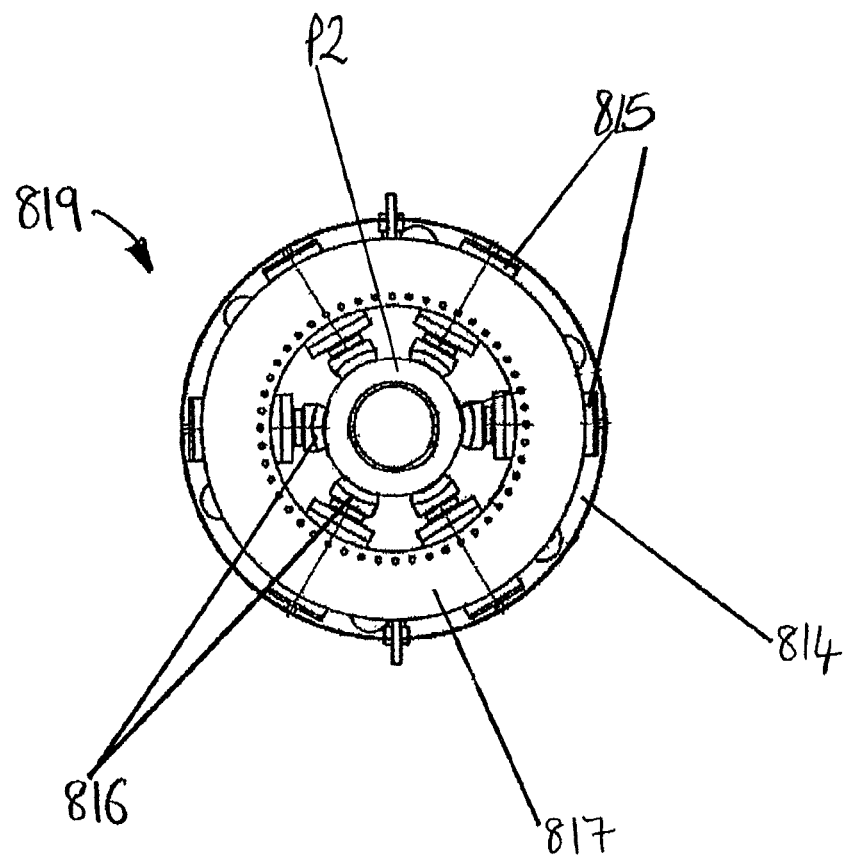
FIG. 4d shows a bottom view of the friction clamp on the tower clamp assembly.

Below, the mounting ring 813 is a further ring 814 for mounting a rotatable friction clamp 819 at the lower end of the garage frame 820. A still further ring 817 is provided beneath the ring 814 and a rotatable sleeve 818 is provided in between the rings 814 and 817. The sleeve 818 can rotate about the longitudinal axis of the garage frame 820. Distributed around the circumference of the sleeve 818 are 6 radial cylinders 815 which can be moved radially in and out with respect to the longitudinal axis. At the inner end of each cylinder 815 is a friction pad 816. The radial cylinders 815 can move in and out to allow these friction pads 816 to grip a pipestring P2 and support its weight. As the friction pads 816 can be moved in and out a variety of pipestring diameters (from 8 inches to 36 inches diameter) can be accommodated. As can be seen in FIG. 4d, the friction pads 816 are shaped to correspond to the rounded shape of the outer circumference of the pipestring P2. The sleeve 818 can be rotated +/−190 degrees about the longitudinal axis to allow the pipestring P2 to be rotated to any orientation about that axis. This allows the gap between bevels and the out-of roundness between the pipestring P2 and the pipeline P to which it will be joined, to be balanced out.

The ILUC 827 is connected at its top end to a cable 822 which is wound around an ILUC winch wheel 821. This winch wheel is mounted at the top of the ILUC garage frame 820. The winch wheel 821 can be rotated to deploy and retract the cable 822, which causes the ILUC to be lowered and raised through the guide 823. By fully deploying the cable 822, the ILUC 827 can be lowered down through a pipestring P2 held by the friction clamp 819 and down to the level of the floor 501 of the welding station 500.

The friction clamp 819 and the ILUC garage frame 820, are rotatable relative to one another about the axis of the garage frame but not otherwise adjustable, so that, when the clamp 819 is clamped to the top of the pipestring P2, the ILUC garage frame is automatically aligned with the pipestring P2. Furthermore that alignment is maintained when the garage frame and friction clamp are allowed to pivot about a vertical axis during alignment of a pipestring.

The tower clamp assembly 800 also comprises a preheating system (not shown) for induction heating the pipestring P2.

The clamps 401, 402, 403 on the string elevator 400 and the friction clamp 819 on the tower clamp assembly 800 are designed so that they cannot be open at the same time. This prevents a pipestring P2 from being dropped. This is achieved by having a mechanical sensor roller (or rollers) on the tower clamp assembly 800 that detect when the pipestring P2 is clamped in the friction clamp 819. When a pipestring P2 is held in the friction clamp 819, the mechanical sensor roller abuts a wheel and operates a valve (or valves). This allows hydraulic fluid to flow in various flow paths and allow the string elevator clamps 401, 402, 403 to open. Importantly, in the absence of any hydraulic flow (i.e. in a natural state), the clamps 401, 402, 403 remain closed.

FIGS. 5a and 5b show a line-up clamp mechanism 352 (the line-up clamp mechanism 353 being of the same design). The line-up clamp mechanism 352 comprises a truss frame 360 upon which the clamp itself is mounted. The clamp itself comprises a main body 361 located in the truss structure 360 and two clamp fingers 362 protruding out from the main body 361 outside the truss structure 360.

The outside edge of the main body 361 has an approximately semi-circular notch to accommodate one half of a pipestring. The two clamp fingers 362 are pivotally mounted on the main body 361 so as to be able to rotate inwards towards each other. Hydraulic cylinders 366 are provided to actuate the clamp finger 362. Each finger 362 has a curved inward edge so as to form a circular hole with the main body 361 when in a closed position. A pipestring can be held in this circular hole. The main body 361 also comprises two rollers and each finger comprises one roller each at the curved edges. These four rollers 365 allow a pipestring to be held by the clamp in a certain horizontal position whilst still allowing the pipestring to be moved vertically up and down through the clamp.

Rollers 363 are mounted on the truss frame 360 to allow the truss frame 360 to move forwards and backwards in relation to the tower 300. The main body 361 of the clamp is also provided with rollers 364 to allow the clamp to be moved sideways in relation to the truss frame 360.

Figure 6:
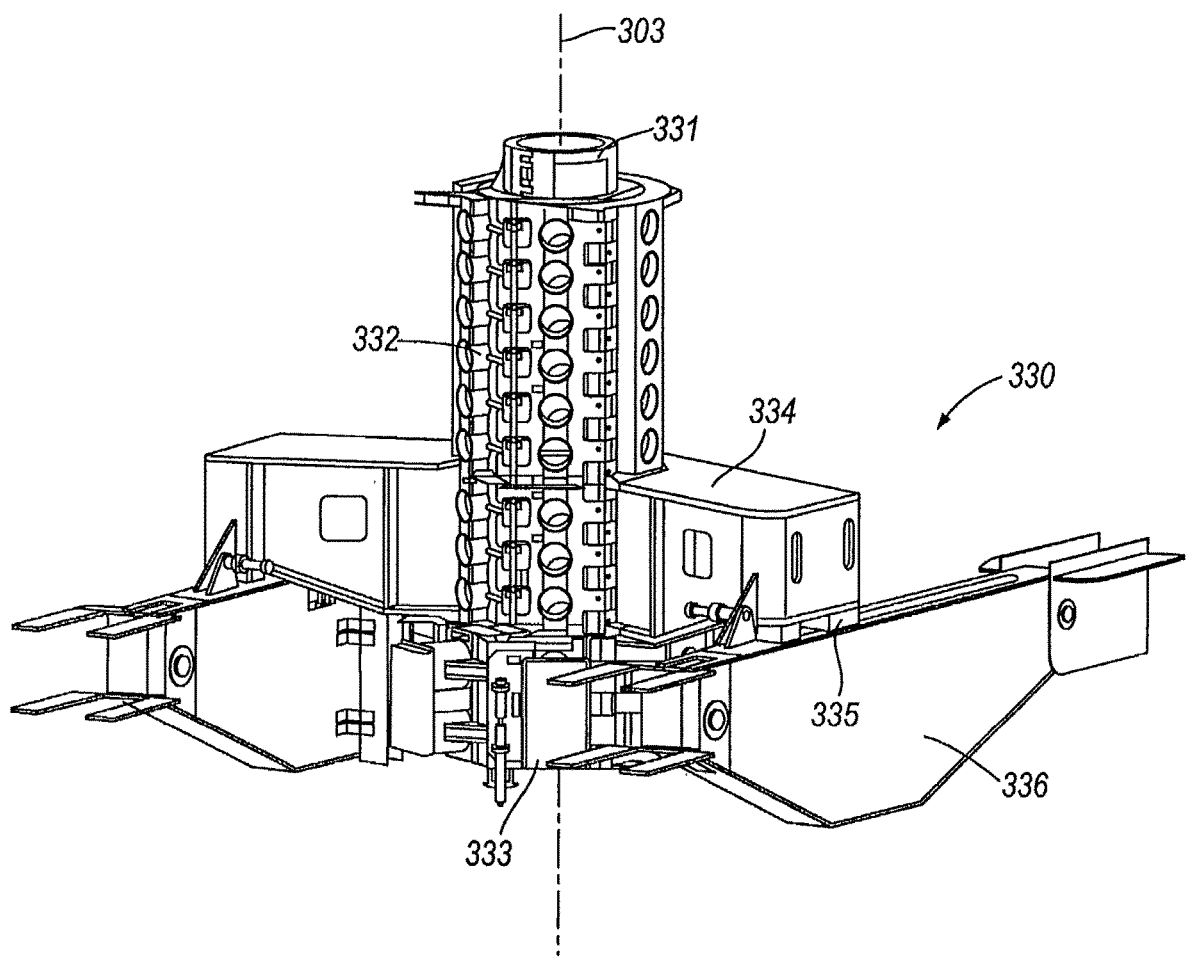
FIG. 6 shows a perspective view of a hang off clamp assembly.

FIG. 6 shows the hang off clamp assembly 330. The hang off clamp assembly 330 comprises two supporting rails 336 which support a hang off clamp table 334. A safety clamp 333 is mounted below the hang off clamp table 334 in between the two supporting rails 336. A friction clamp 332 is mounted on top of the safety clamp 333 in the middle of the hang off clamp table 334. A collar clamp 331 is located above the friction clamp 332. The collar clamp 331, friction clamp 332 and safety clamp 33 are all lined up with the pipe-laying axis 303.

The hang off clamp assembly 330 is the main component for handling the pipeline P as it holds the weight of the deployed pipeline P 90% of the time. The other 10% of time, the weight is held by the travelling clamp assembly 340 during laying. The lower section of the tower 310, through the hang off clamp assembly 330 and travelling clamp assembly 340, accommodates the tension in the pipeline being laid. The tension may be approximately 2000 tonnes or more.

The hang off friction clamp 332, collar clamp 331 and safety clamp 333 can be retracted after fully opening two front doors (not shown) on the clamps 331, 332, 333. This clears the opening 302 for the passage of a bulky item.

The safety clamp 333 is a friction clamp with a holding capacity of 2500 T. It acts as a contingency system to stop the pipe if pipe slippage is detected. When actuated, the safety clamp 333 squeezes the pipeline P irrespective of whether damage could be caused to the pipeline or its coating. The safety clamp is fitted with steel pads to grip the pipeline P.

FIG. 7 shows the bulky item handling skid 700. The skid 700 comprises a main frame structure 701 and a tiltable frame 702 pivotally connected to one end of the main frame structure 701. The tiltable frame 702 is tiltable from a horizontal position where it rests on the main frame structure 701 and a vertical position where it is pivoted to be at 90 degrees to the main frame structure 701. A hydraulic cylinder 708 is connected to both the main frame structure 701 and the tiltable frame 702 to effect this pivoting. The main frame structure 701 is mounted on rollers 703 for sliding the skid 700 along rails on the deck 103 of the vessel towards and away from a bulky item loading position adjacent the base of the tower 300. A locomotion system 704, connected to the main frame structure 701 by a connection rod 705, causes the skid to be moved on these rails. In addition, removable rails (not shown) can also be provided to move the skid 700 over the opening 302 to a storage area on the other side of the tower 300.

The tiltable frame 702 is provided with pads 706 for resting a bulky item on. It also has a pair of bulky item shoes 707 to supporting the weight of the bulky item on the skid 700 when the tiltable frame 702 is vertical. A hydraulic lock 711 is also provided to secure the bulky item to the tiltable frame 702.

In addition, a hydraulic cylinder 709 is connected to each of the bulky item shoes 707 to move the shoes 707 in relation to the tiltable frame 702. This adjusts the vertical height of the bulky item on the tiltable frame 702 with respect to the tower 300. Also, another hydraulic cylinder 710 is provided to move the tiltable frame 702 sideways in relation to the main structure 701. This adjusts the sideways position of the bulky item with respect to the tower 300.

In use, a pipeline is laid using the tower 300.

FIG. 2a, which has already been described, shows the tower 300 and associated equipment in an initial state. Here, pipestring P1 is on the lower section 310 of the tower and is welded to pipestring PS and the deployed pipeline P. Pipestring P2 is located on the upper section 311 of the tower. It is being held by the friction clamp 819 of the tower clamp assembly 800 and tower arm 371. The ILUC 827 is partly deployed and is positioned mid-way down the length of the pipestring P2. Pipestring P2 is not held directly above pipestring P1 on the pipe-laying axis 303. Instead, it is held in a stand-by position in between the string axis 408 and the pipe-laying axis 303. Pipestring P3 is clamped to string elevator 400 on the deck 103 of the vessel.

In the initial state, the friction clamp 343 holds the top of the pipestring PS. The hang off clamp 330 is open. The travelling clamp assembly 340 has just deployed pipeline after moving from the top of its travel path to the bottom of its travel path, as shown in FIG. 2a. The coating station 600 is positioned in its storage position away from the base of the tower with its doors open. The doors of the welding station 500 are open. Clamps 372 and 373 are closed around pipestring P1 to hold it is position. The tower roller 370 and line-up clamp mechanisms 352 and 353 are open.

Figure 8A:
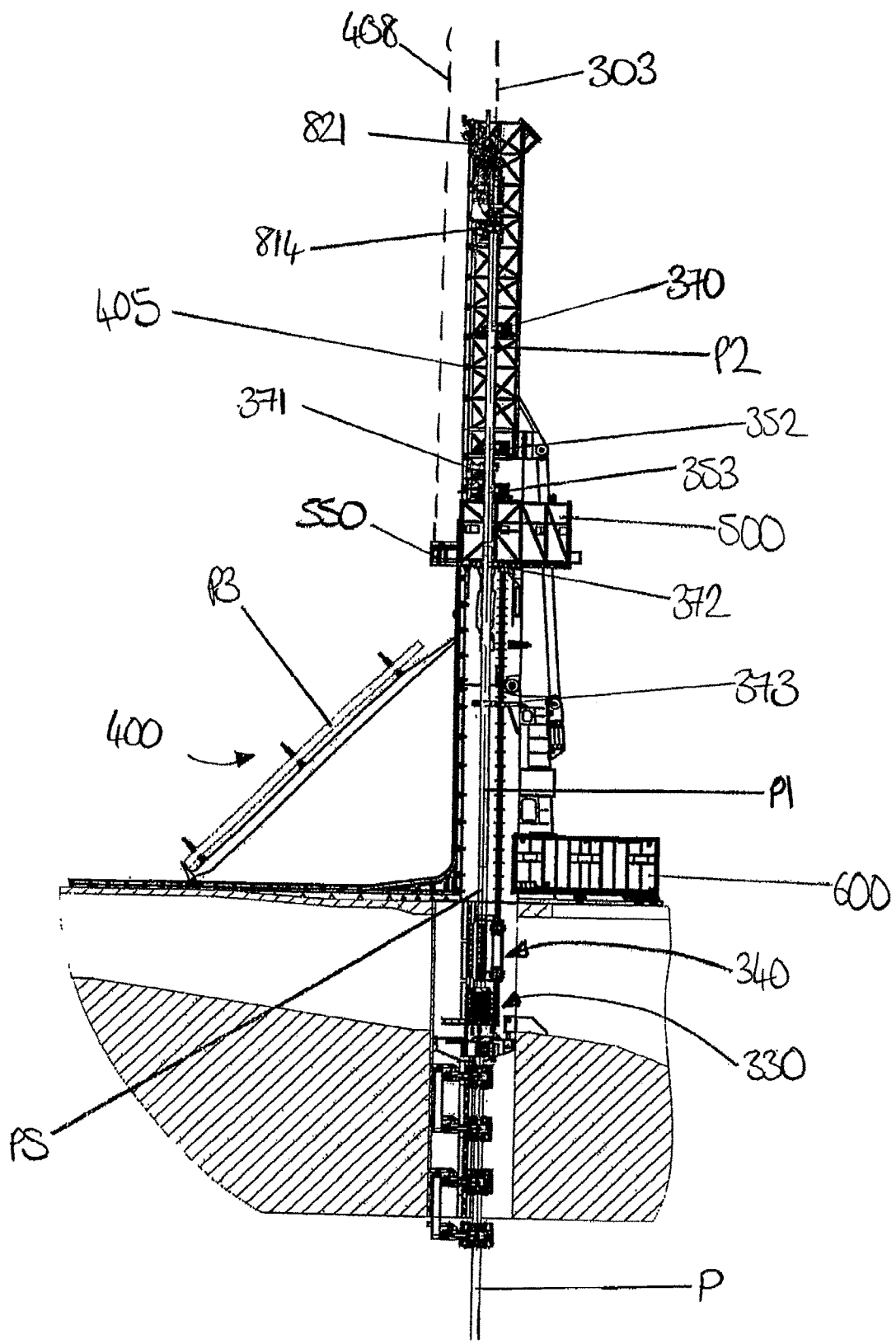
FIG. 8a shows a side view of the pipe-laying tower in a first laying step, on the vessel of FIG. 1.
Figure 8B:
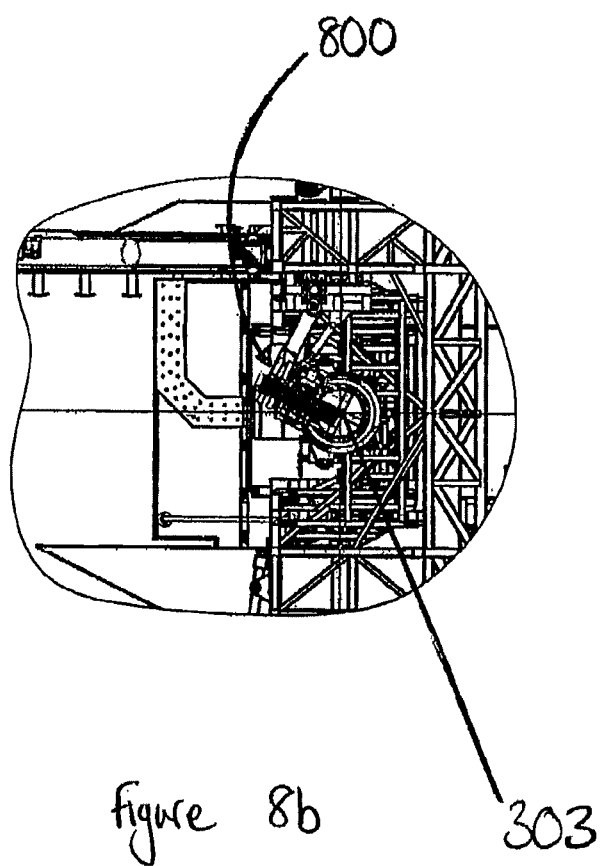
FIG. 8b shows a top view of part of the tower, also in a first laying step.

FIG. 8a shows the tower 300 and associated equipment in a "step 1" state. The changes from FIG. 2a will be described:

i) The hang off clamp is closed around pipestring PS to take the weight of the deployed pipeline P below it. Once the hang off clamp is taking this weight, the friction clamp 343 is then released from PS.

ii) The string elevator 400 (with pipestring P3) is being rotated to be parallel to the tower 300 and then will be lifted up to the upper section 311 of the tower 300.

iii) The first 805 and secondary 809 arms of the tower clamp assembly 800 (and the corresponding tower arm 371) are rotated to bring pipestring P2 onto the pipe-laying axis 303, as shown in FIG. 8b.

Figure 9:
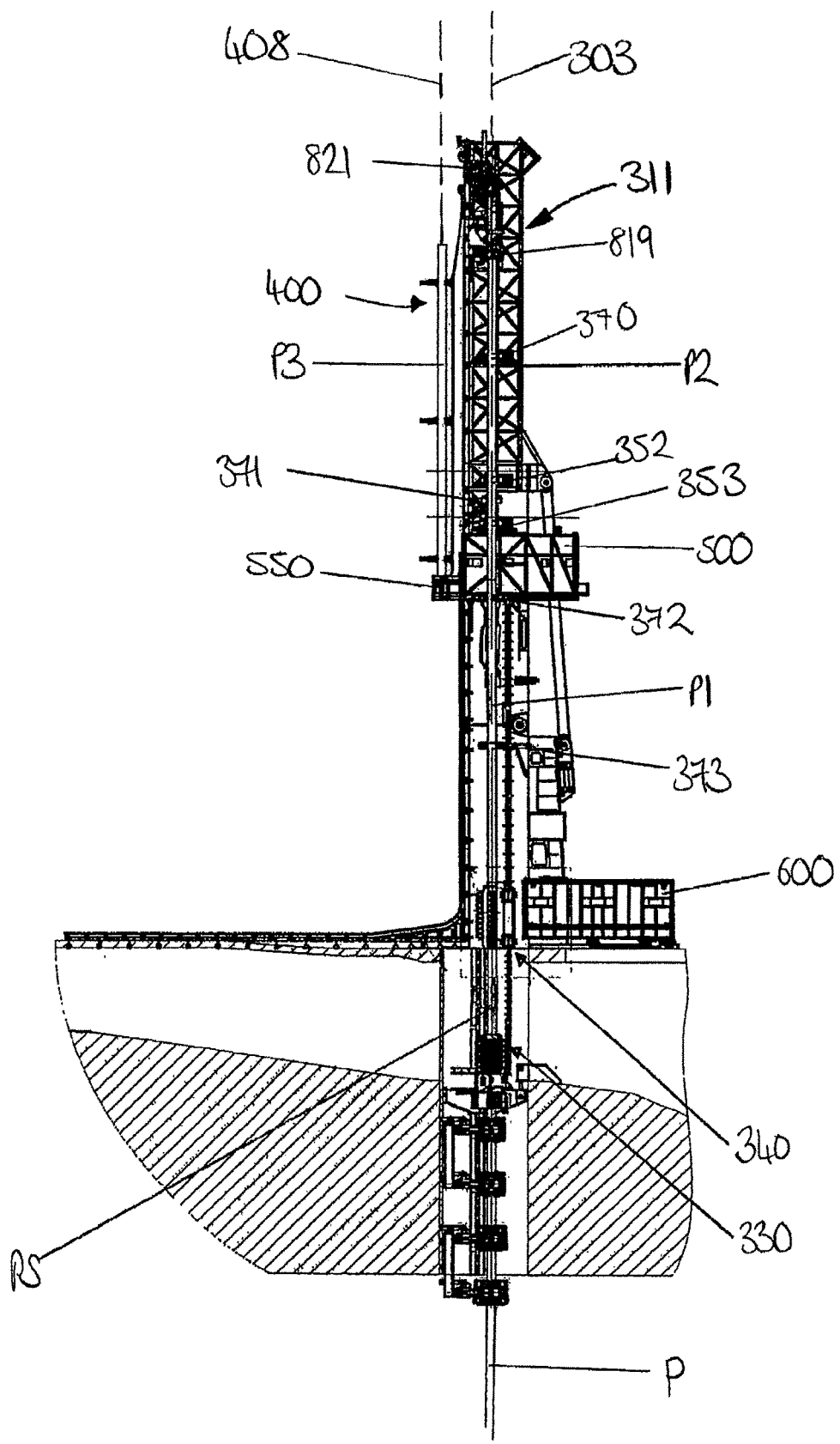
FIG. 9 shows a side view of the pipe-laying tower in a second laying step, on the vessel of FIG. 1.

FIG. 9 shows the tower 300 and associated equipment in a "step 2" state. The changes from FIG. 8a will be described:

i) The string elevator 400 (with pipestring P3) has reached the upper section 311 of the tower.

ii) The doors of the welding station 500 are closed around the upper region of pipestring P1 and the lower region of pipestring P2.

iii) The ILUC 827 is lowered further down pipestring P2 to the join of pipestrings P2 and P1.

iv) The travelling clamp assembly 340 is started to be raised up its travel path.

v) Line-up clamp mechanisms 352, 353 and tower roller 370 are closed around pipestring P2.

vi) The tower arm 371 is released from pipestring P2 and rotated back to the stand-by position.

vii) Line-up is performed using line-up clamp mechanisms 352, 353. Friction clamp 819 and tower roller 370 follow the movement of the pipestring P2 and are "slave" line-up devices. If necessary, friction clamp 819 is rotated to match the off-roundness of the upper end of pipestring P1 with the lower end of pipestring P2. This line-up operation is performed by welding station 500 operators using a hand-held portable console.

viii) Welding of pipestrings P1 and P2 is performed in the welding station 500.

Figure 10:
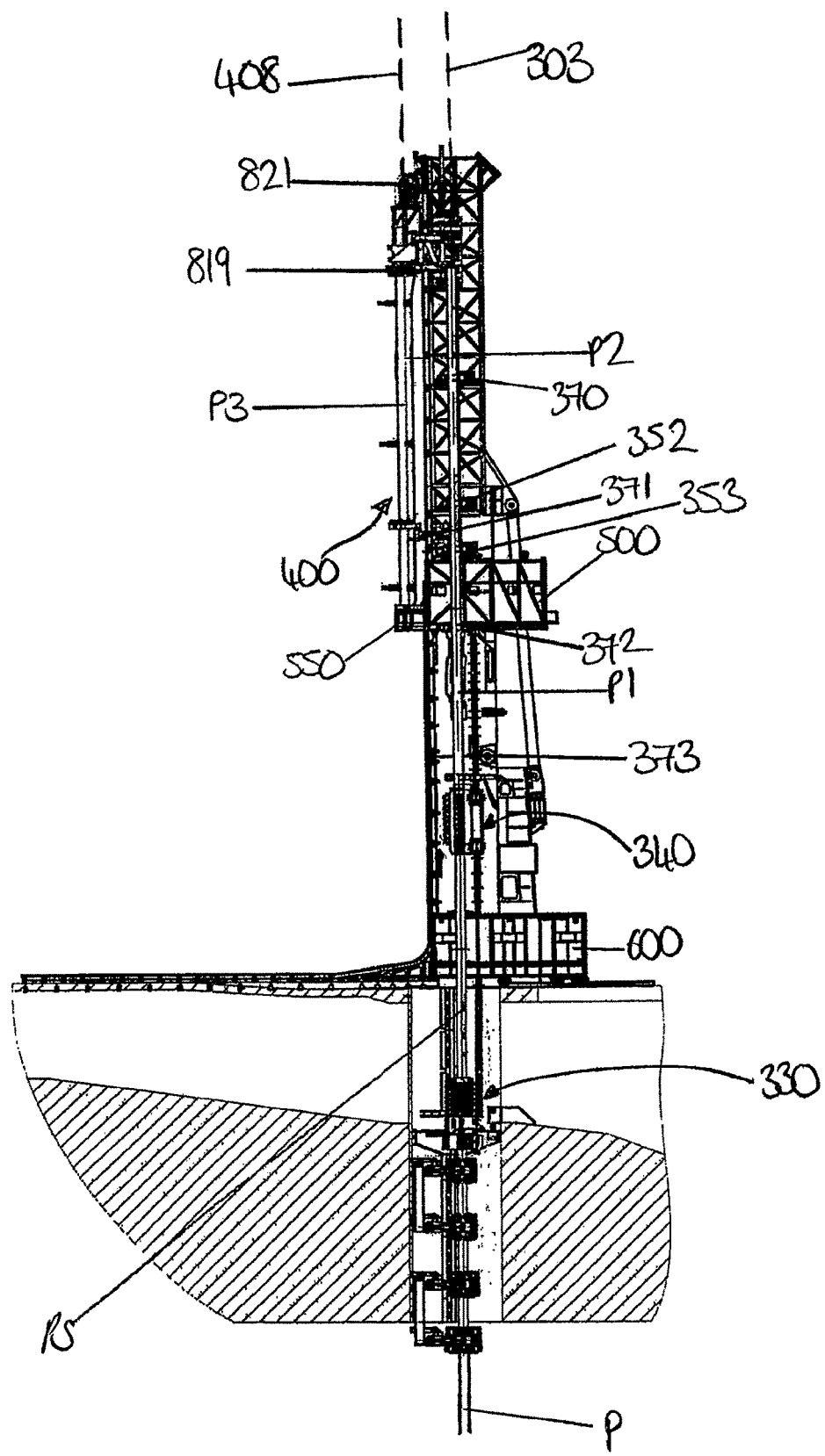
FIG. 10 shows a side view of the pipe-laying tower in a third laying step, on the vessel of FIG. 1.

FIG. 10 shows the tower 300 and associated equipment in a "step 3" state. The changes from FIG. 9 will be described:

i) Once the travelling clamp assembly 340 is raised above the level of the coating station 600, the coating station is moved into its working position adjacent the base of the tower 300. The doors of the coating station 600 are closed around pipestring P1. The pipestring P1 is coated in the coating station 600.

ii) The travelling clamp assembly 340 is stopped just below clamp 373.

iii) Once welding of pipestrings P1 and P2 is complete, the ILUC is raised up through pipestring P2 to the garage frame 820.

iv) The tower roller 370 is energised so that the pipestring P2 can be held in position. The friction clamp 819 is then released and the first 805 and secondary 809 arms of the tower clamp assembly 800 are rotated so that the friction clamp 819 is rotated to the stand-by position.

Figure 11:
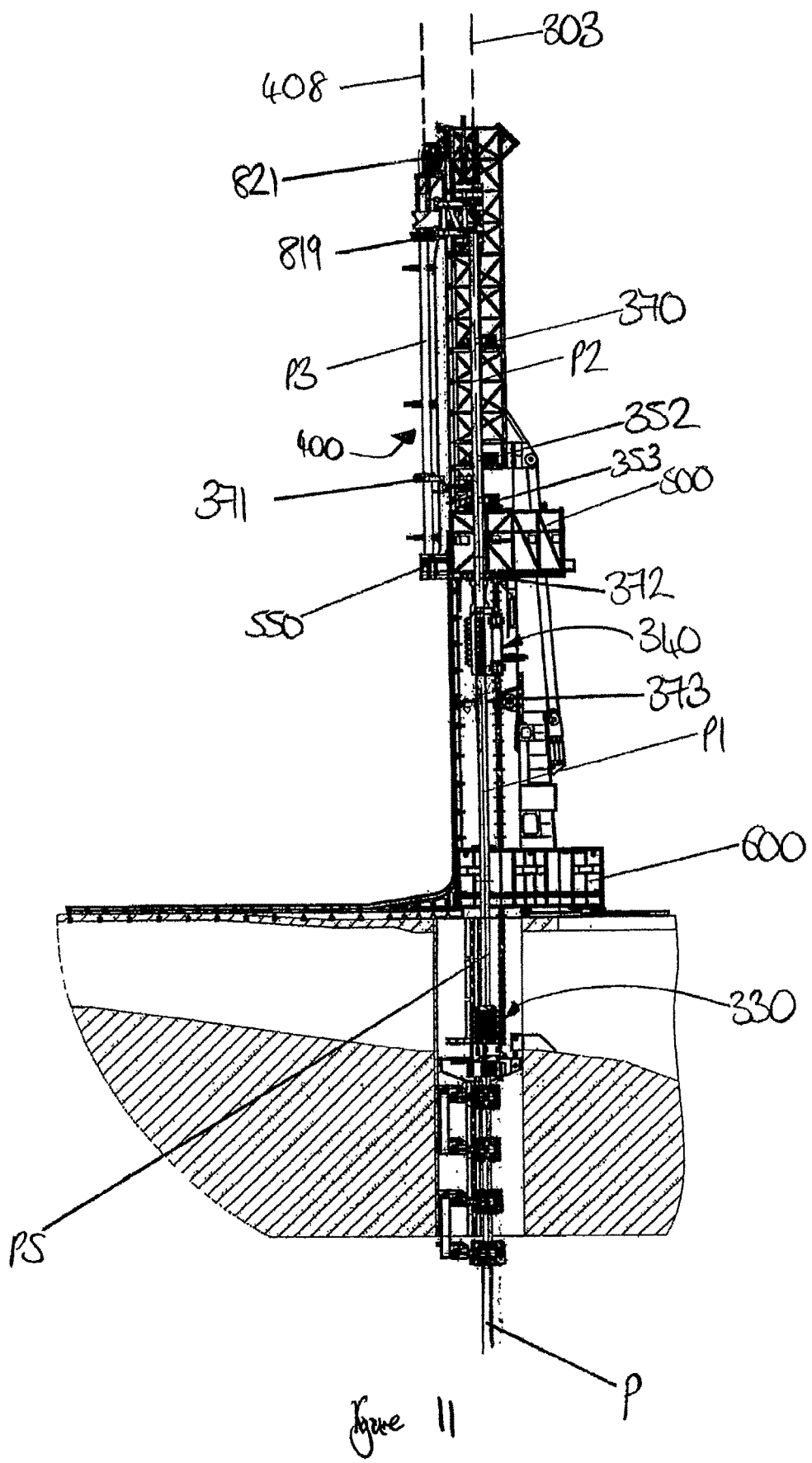
FIG. 11 shows a side view of the pipe-laying tower in a fourth laying step, on the vessel of FIG. 1.

FIG. 11 shows the tower 300 and associated equipment in a "step 4" state. The changes from FIG. 10 will be described:

i) The clamp 373 is folded into its stand-by position and the travelling clamp assembly 340 is raised past the clamp 373 towards the top of its travel path.

ii) Friction clamp 819 and tower arm 371 are moved from the stand-by position and closed around the pipestring P3 on the string elevator 400. The string elevator clamps 401, 402, 403 are released.

Figure 12:
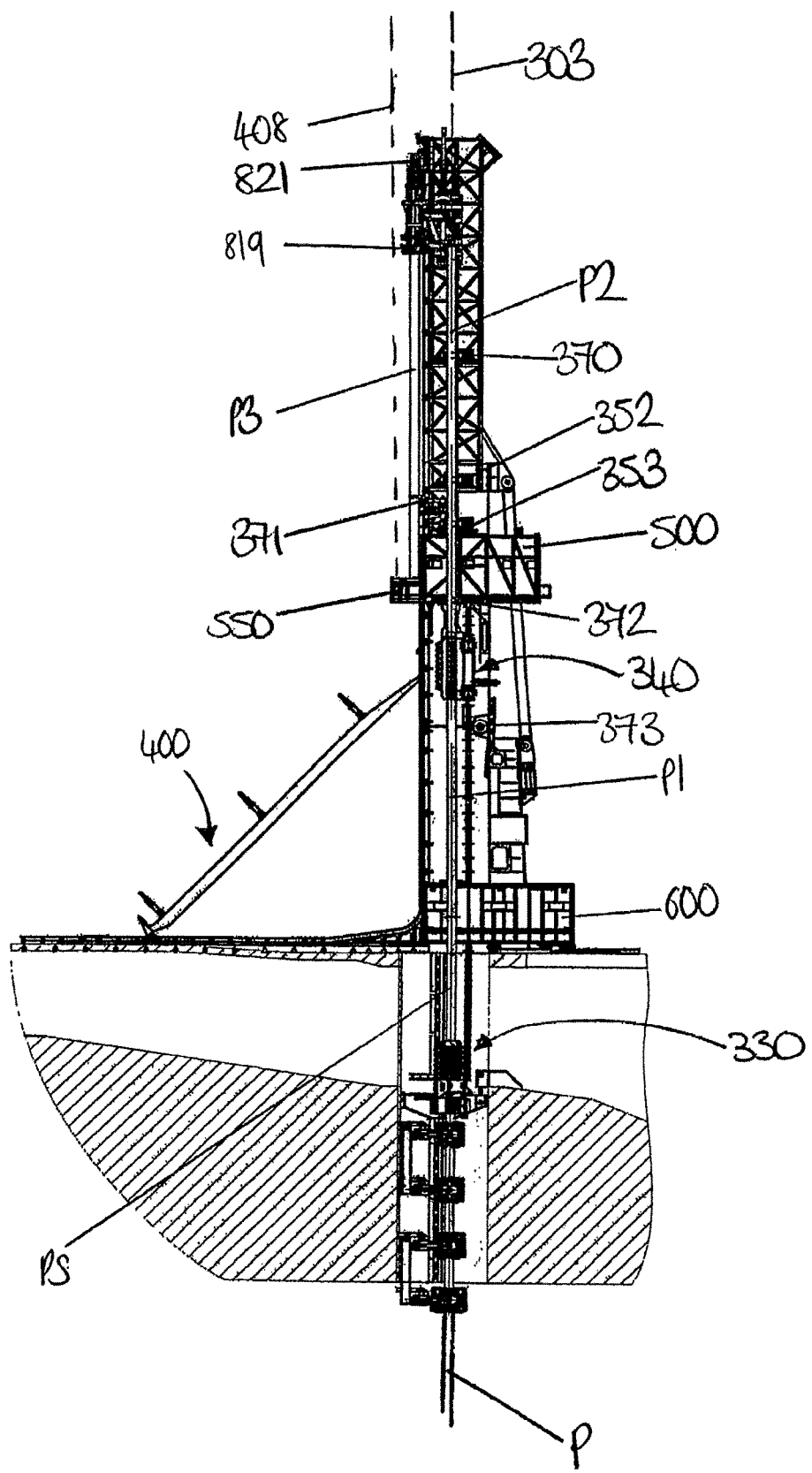
FIG. 12 shows a side view of the pipe-laying tower in a fifth laying step, on the vessel of FIG. 1.

FIG. 12 shows the tower 300 and associated equipment in a "step 5" state. The changes from FIG. 11 will be described:

i) The first 805 and secondary 809 arms of the tower clamp assembly 800 (and the corresponding tower arm 371) are rotated to bring pipestring P3 into stand-by position above the safety balcony 550.

ii) The ILUC 827 is lowered through pipestring P3 to about mid-way along its length.

iii) The string elevator 400 (without pipestring P3) is lowered back down the tower 300 to the deck 103 of the vessel 100.

iv) When the travelling clamp assembly 340 has reached the top of its travel path just below the welding station 500, it is clamped around the top region of the pipestring P1. The travelling clamp assembly 340 then takes the weight of the deployed pipeline P and pipestrings PS and P1. The hang-off clamp is then released.

Figure 13:
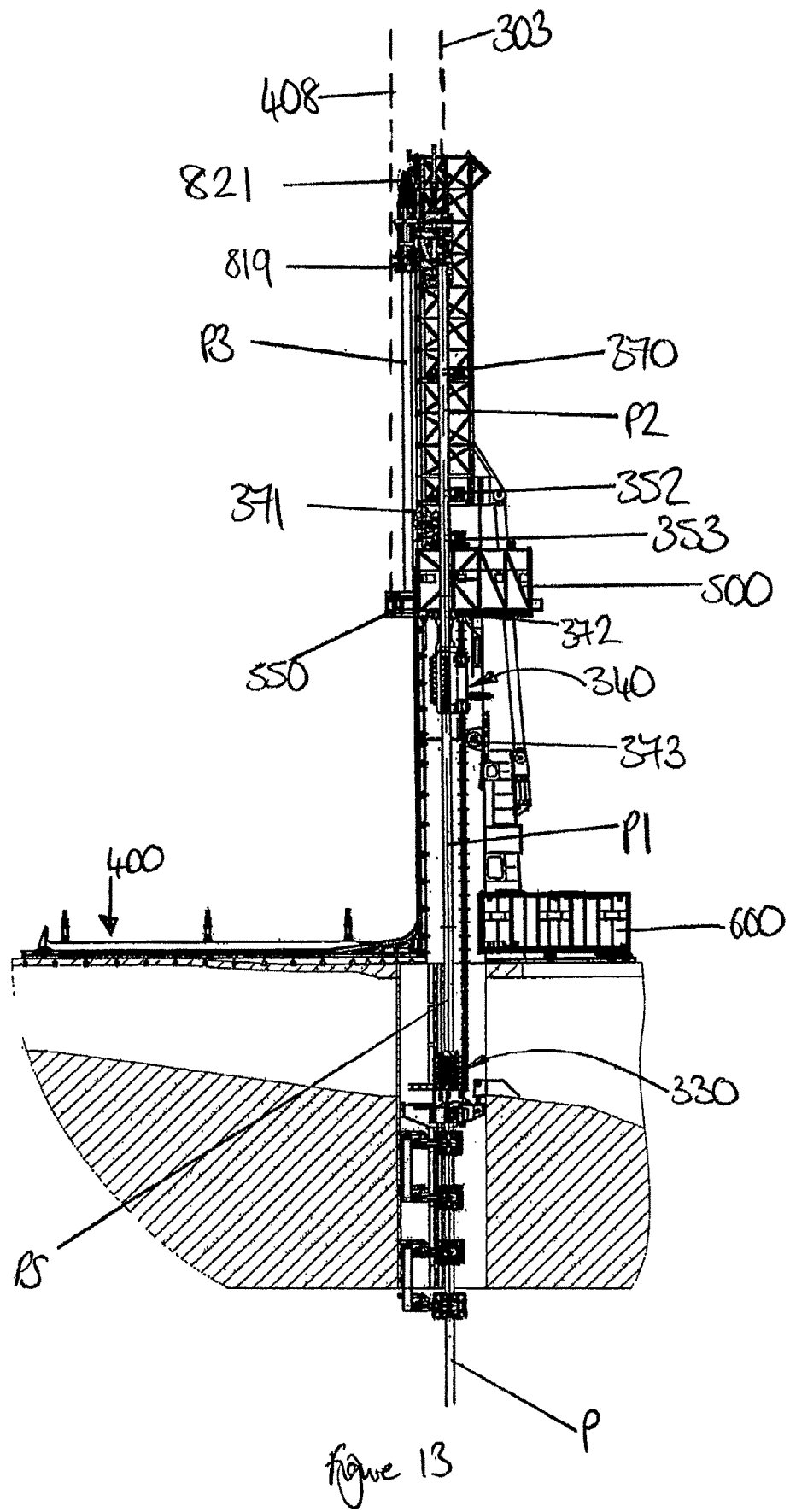
FIG. 13 shows a side view of the pipe-laying tower in a sixth laying step, on the vessel of FIG. 1.

FIG. 13 shows the tower 300 and associated equipment in a "step 6" state. The changes from FIG. 12 will be described:

i) When welding at the welding station 500 is complete, the doors of the welding station are opened.

ii) When coating at the coating station 600 is complete, the doors of the coating station are opened. The coating station is then retracted to its storage position away from the base of the tower.

ii) The travelling clamp assembly 340 is then lowered to deploy pipeline. It is lowered to the bottom of its travel path (as in FIG. 2a). This pulls pipestring P1 into the position occupied by pipestring PS in FIG. 2a. It also pulls down pipestring P2 to the position occupied by pipestring P1 in FIG. 2a. The flute 320 guides the pipeline as it is deployed and controls the bending of the pipeline as it leaves the vessel and is laid on the seabed.

The tower 300 and associated equipment is then returned to the initial state again, ready to deploy another pipestring of pipeline. This retiring to the initial state is done as follows:

i) When the string elevator reaches the deck 103 of the vessel 100, a new pipestring (P4) is loaded onto the string elevator 400.

ii) The clamp 373 is moved from its stand-by position into the pipe-laying axis 303. The clamp 373 is closed around pipestring P2. Clamp 372 is also closed around pipestring P2.

iii) Line-up clamp mechanisms 352, 353 and tower roller 370 are opened.

It can be seen that in this embodiment of the invention, the top section of the tower 311 is used for receiving the pipestring P3 from the string elevator 400 and for line-up of the pipe-string on the pipe-laying path 303. The bottom section of the tower 310 is used for welding the pipestrings P3, P2, P1 and the pipeline P together and lowering the joined pipeline P from the top of the bottom section 310 using the travelling clamp assembly 340.

Figure 14A:
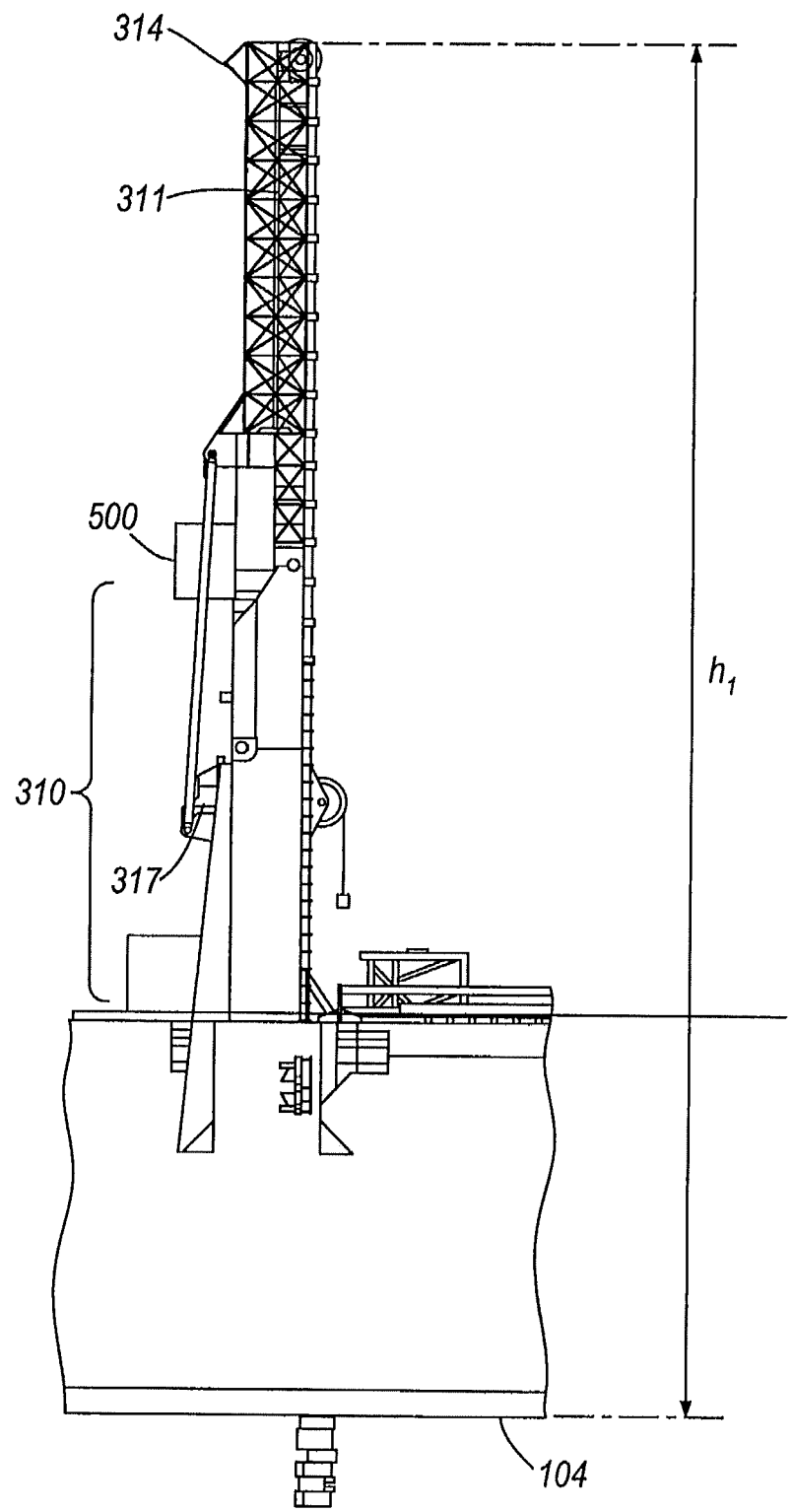
FIG. 14a shows a side view of the pipe-laying tower in a pipe-laying configuration, on the vessel of FIG. 1.
Figure 14B:
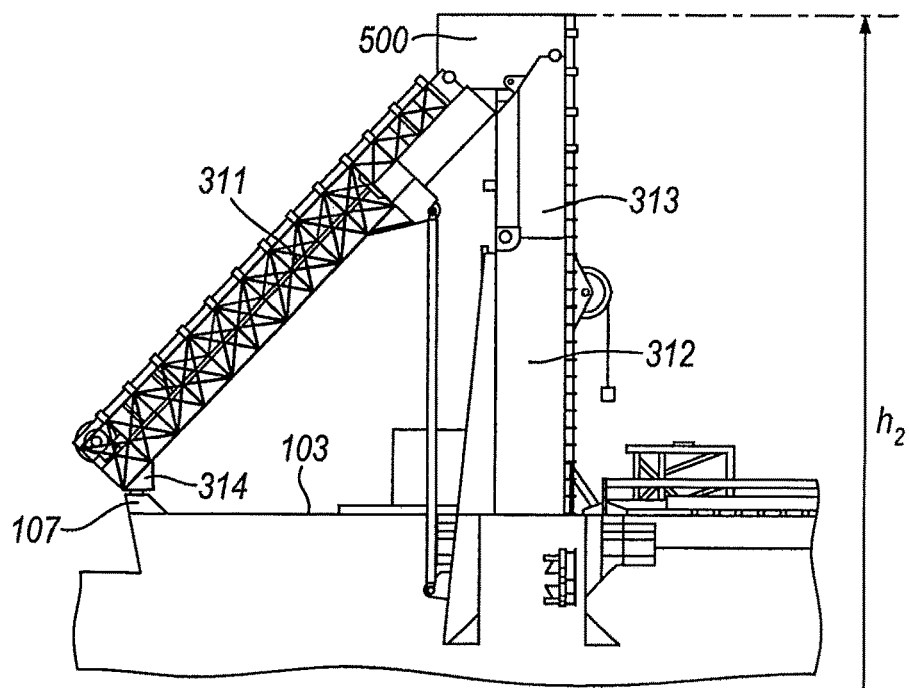
FIG. 14b shows a side view of the pipe-laying tower in a transit/stowed configuration, on the vessel of FIG. 1.
Figure 14C:
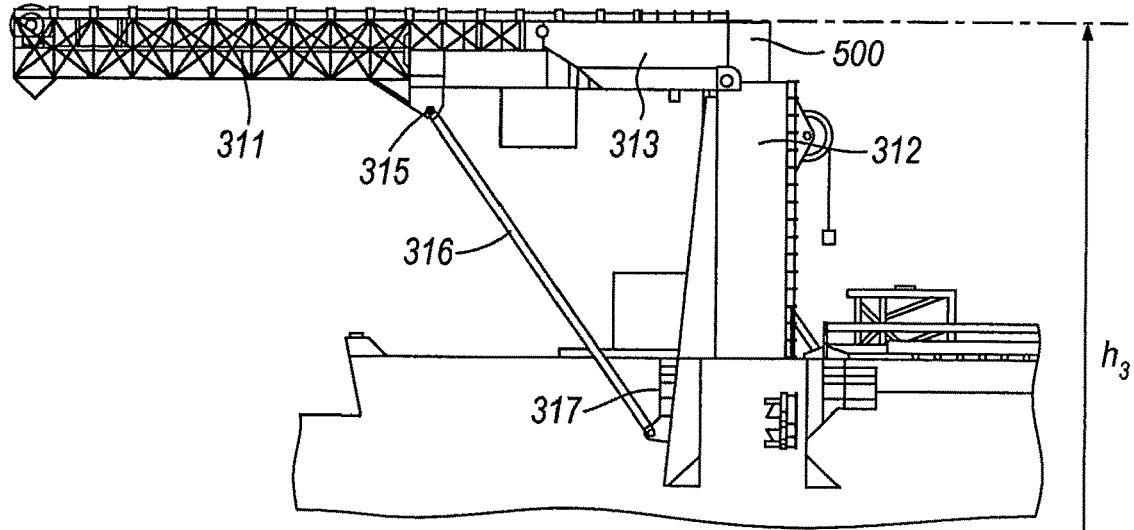
FIG. 14c shows a side view of the pipe-laying tower in a low-height/bridge passage configuration, on the vessel of FIG. 1.

FIGS. 14a to 14c show the tower in different configurations. The tower comprises a lower section 310 and an upper section 311.

The lower section is sub-divided into a lower part 312 and an upper part 313. The lower part 312 of the lower section 310 of the tower 300 is formed as an integral, structural part of the rest of the vessel 100 and is an extension of the hull of the vessel. This gives the tower 300 more rigidity and makes line-up of the pipestrings easier. The lower part 312 consists of two caisson legs; located either side of the pipe-laying axis 303 and the opening 302. The lower part 312 contains the clamp 373.

The upper part 313 is pivotally mounted to the lower part 312, as can be seen in FIG. 14c. The welding station 500 is located on the top of the upper part 313. The welding station 500 is held in place by bolted flanges. The clamp 372 is located under the floor 501 of the welding station 500. The line-up clamp mechanism 353 is located on the roof 502 of the welding station 500. The upper part 313 also contains the sheave block 344 of the travelling clamp assembly 340 and the tower arm 371.

This upper part 313 of the lower section 310 is only pivoted in exceptional circumstances (to pass under low bridges) and so is generally bolted in its upright position.

The upper section 311 is pivotally mounted to the upper part 313 of the lower section 310, as can be seen in FIG. 14b. The upper section 311 contains the line-up clamp mechanism 352, tower roller 370 and tower clamp assembly 800.

The pivoted hydraulic ram 316 is pivotally connected at 315 to a lower portion of the upper section 311 and also to a trolley 317 on rails on the lower part 312 of the lower section 310 of the tower 300. These rails extend from a lower region of the caisson legs of the lower part 312 of the tower to an upper region of the top of the lower part 312 of the tower 300.

The top of the tower 300 is provided with an abutment portion 314 for abutment against a corresponding abutment portion 107 on the deck 103 of the vessel 100.

In FIG. 14a, the tower is in its pipe-laying configuration with all parts/sections of the tower extending vertically. When in this vertical (pipe-laying) configuration, the upper section 311 is held in place with respect to the upper part 313 of the lower section 310 by hydraulic locking pins (not shown). The height of the vessel 100 from the keel line 104 to the highest point of the tower, h1 is 125 m.

FIG. 14b shows the tower 300 collapsed for transit. The string elevator 400 would also be lowered to be on the deck 103 of the vessel 100 for transit. In order to convert the tower into the transit configuration, the hydraulic locking pins holding the upper section 311 to the upper part 312 of the lower section 310 are released to allow the upper section 311 to pivot with respect to the lower section 310 of the tower 310. The trolley 317 is then lowered down the rails causing the upper section 311 to pivot down so that the tower abutment portion 314 abuts against the vessel abutment portion 107. The height of the vessel 100 from the keel line 104 to the highest point of the tower, h2 is 81.5 m.

FIG. 14c shows the tower 300 collapsed for passage through a low bridge, for example. The string elevator 400 would also be lowered to be on the deck 103 of the vessel 100 for bridge passage. In order to convert the tower into the bridge passage configuration, the sheave block 344 upon which the travelling friction clamp 343 is mounted is lowered on rails 342 to the lower part 312 of the lower section 310 of the tower. This ensures that the cables 347 associated with the travelling clamp assembly 340 are all brought down to a point on the tower 300 that does not move during the collapsing of the tower. This means the cable rigging 347 does not have to be dismantled for the vessel 100 to go through a bridge, for example. The bolts holding the upper part 313 of the lower section 310 to the lower part 312 of the lower section are removed to allow the upper part 313 to pivot with respect to the lower part 312. The trolley 317 is then lowered down the rails causing the upper part 313 to pivot down to a horizontal position. The height of the vessel 100 from the keel line 104 to the highest point of the tower, h3 is 67 m.

If a bulky item needs to be laid, the bulky item handling skid is moved to a loading position away from the base of the tower 300. The bulky item string (comprising a bulky item and upper and lower extension pipe lengths) is placed on the bulky item skid 700 on the tiltable frame 702 (in its horizontal position). This can be done using a main crane of the vessel 100. The bulky item is then locked in place by the hydraulic lock 711. The skid 700 is then moved towards the tower 300. The tiltable frame 702 is then tilted to be vertical and parallel to the tower 300. The various hydraulic cylinders 709, 710 can then be used to line up the bulky item with the travelling clamp assembly 340. The friction clamp 343 is then clamped on the upper end of the bulky item upper extension pipe length. The hydraulic lock 711 is then released. The lower end of the lower extension pipe is then welded to the pipeline P in the coating station and then the friction clamp 343 is lowered to deploy the bulky item.

If the pipeline P being laid (either during S-laying or J-laying) needs to be abandoned, this is done with a common abandonment and recovery system (not shown). The pipeline P can then be recovered using the same system. In this way, the pipeline P can not only be abandoned/recovered but it can be transferred from the S-laying to the J-laying method (and vice versa) using a common abandonment and recovery system. A typical J-laying depth is 1000 m or deeper. However, embodiments of the invention are able to be used at depths exceeding 1500 m as the J-lay tower 300 is vertical (so can lay pipeline to a greater depth). There is no need to have a tiltable J-lay tower as the vessel 100 is also provided with S-laying equipment that can cope with laying pipe at depths that would otherwise be done using a tiltable J-lay tower.

Figure 15:
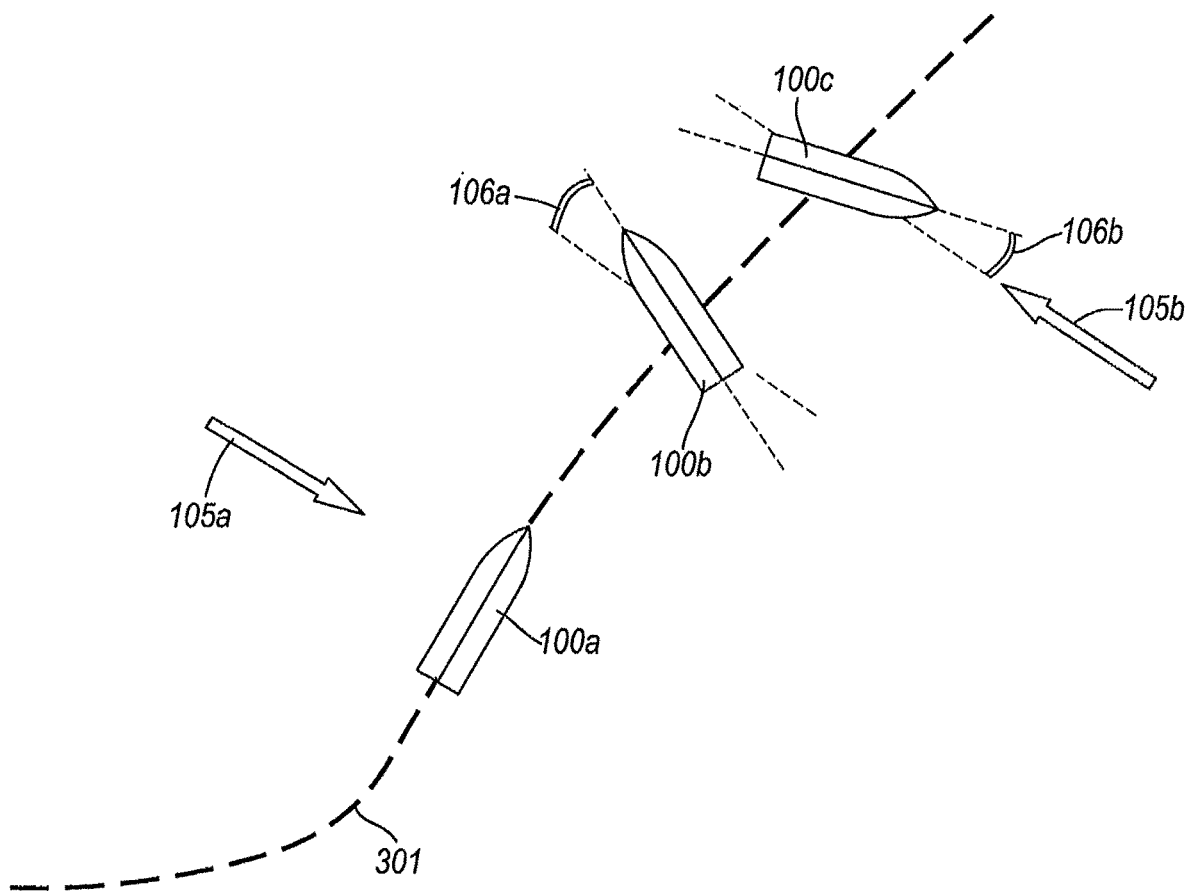
FIG. 15 shows a top view of the vessel of FIG. 1 and the pipeline path.

A further possible feature of the operation of the vessel is illustrated in FIG. 15, in which the vessel is shown in three different orientations 100a, 100b and 100c. A dotted line 301 in FIG. 15 shows the path along which the pipeline is being laid. The first orientation of the vessel 100a is entirely conventional: the longitudinal axis of the vessel is parallel to the pipe-laying path 301; this orientation is appropriate in ordinary sea conditions.

If, however, a strong sea swell in the direction indicated by arrow 105a (perpendicular to the path 301) arises, the vessel can adopt the second orientation 100b, where the longitudinal axis of the vessel is almost perpendicular to the pipe-laying path 301, being inclined at an angle 106a to the perpendicular to the path 301. In this particular, extreme, example of the invention, the angle 106a is about 22.5 degrees. In this case the vessel is heading almost directly into the swell and the pipeline is guided in a direction transverse to the vessel as it leaves the tower 300. Since the tower is vertical and the flute 320 is provided with rollers around all 360 degrees of the pipeline passing through the flute, it is able to guide the pipeline along this path as it leaves the vessel. The vessel is still propelled along a path parallel to the path 301, that is at an inclination of about 67.5 degrees to its longitudinal axis, by its propulsion system.

As will now be understood, if on the other hand there is a strong sea swell in the direction indicated by arrow 105b (perpendicular to the path 301 but in the opposite direction to the swell indicated by arrow 105a), the vessel can adopt the third orientation 100c, where the longitudinal axis of the vessel is almost perpendicular to the pipe-laying path 301, being inclined at an angle 106b to the perpendicular to the path 301. In this particular, extreme, example of the invention, the angle 106b is about 22.5 degrees. In this case the vessel is heading almost directly into the swell and the pipeline is guided in a direction transverse to the vessel as it leaves the tower 300. The vessel is still propelled along a path parallel to the path 301, that is at an inclination of about 67.5 degrees to its longitudinal axis, by its propulsion system.

Whilst the present invention has been described and illustrated with reference to particular embodiments, it will be appreciated by those of ordinary skill in the art that the invention lends itself to many different variations not specifically illustrated herein.

For example, the embodiment described above is designed for use in laying pipestring formed from 3 joints (3J). In other words, each pipestring is made up of 3 lengths of pipe, welded or pre-fabricated together in some way. This pre-fabrication usually takes place on the vessel. A typical 3J pipestring will be approximately 37.5 m long. However, other embodiments may be designed for laying 1J, 2J, 4J, or more. As will be understood, a 1J pipestring consists of a single length of pipe.

As another example, each upper sheave block 344 may be fixed and in that configuration, the cables 347 could be removed from the sheave blocks 344 when the tower is converted into the low-height/bridge passage configuration.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pipe-laying vessel including a pipe-laying tower extending upwardly from a main deck of the vessel, the tower comprising:
    a lower section and an upper section,
    the lower section extending upwardly from a proximal end to a distal end above the main deck of the vessel, and
    the upper section movably mounted on the lower section,
    the tower having a first pipe-laying configuration for laying pipeline in which the upper section is positioned above the lower section and pipe is passed from the upper section to the lower section when, in use, it is being laid, and a second stowed configuration in which the upper section is moved relative to the lower section and the overall height of the tower is reduced; and
    means for pivoting the upper section in relation to the lower section such that an abutment portion at a terminal end of the upper section is pivoted down to be supported on a deck of the vessel when in the second stowed configuration, wherein the lower section of the pipe-laying tower is divided into a lower part and an upper part, and the upper part is configured to pivot with respect to the lower part.

2. The pipe-laying vessel as claimed in claim 1, further comprising:
a pipestring elevator for rotating a pipestring from a substantially horizontal orientation at a base of the tower to an orientation substantially parallel to the tower, and
wherein the pipestring elevator is mounted for movement along the tower such that the pipestring elevator can rotate the pipestring to be substantially parallel to the tower and then lift the pipestring up the tower.

3. A vessel as claimed in claim 2, wherein the pipestring elevator is in the form of a strongback such that in the rotation stage, the pipestring elevator is simultaneously translated towards the tower whilst a first end of the pipestring elevator nearest to the tower is lifted up the tower.

4. A vessel as claimed in claim 3, wherein the pipestring elevator is mountable at its first end such that as the first end is moved up the tower from the base of the tower to a height up the tower corresponding to the length of the pipestring, the pipestring is rotated to be substantially parallel to the tower and then when the first end is moved further up the tower, the pipestring is lifted up the tower.

5. A vessel as claimed in claim 4, wherein the first end is mountable in a guide mechanism so that the first end can be guided as it moves up the tower.

6. A vessel as claimed in claim 3, wherein the pipestring elevator comprises a stopper at its second end so when the pipestring elevator is lifting a pipestring up the tower, the stopper provides an abutment for the pipestring and takes a significant proportion of the weight of the pipestring.

7. A vessel as claimed in claim 1, wherein the pipe-laying tower is capable of accommodating a tension in the pipeline being laid of 2000 metric tons.

8. A vessel as claimed in claim 1, wherein the tension in the pipeline being laid is taken by the lower section, and not by the upper section.

9. A vessel as claimed in claim 1, wherein the abutment portion at the terminal end of the upper section is pivoted down to be supported on an abutment portion of a deck of the vessel when in the second stowed configuration.

10. A vessel as claimed in claim 1, wherein the vessel includes a hull, and the lower section of the pipe-laying tower comprises an integral extension of the hull.

11. A pipe-laying vessel including a pipe-laying tower extending upwardly from a main deck of the vessel, the tower comprising:
a lower section and an upper section,
the lower section extending upwardly from a proximal end to a distal end above the main deck of the vessel, and
the upper section movably mounted on the lower section, and
the tower having a first pipe-laying configuration for laying pipeline in which the upper section is positioned above the lower section and pipe is passed from the upper section to the lower section when, in use, it is being laid, and a second stowed configuration in which the upper section is moved relative to the lower section and the overall height of the tower is reduced;
wherein the lower section of the tower comprises:
a first lower part extending upwardly from a proximal end to a distal end above the main deck of the vessel, and
a second upper part extending upwardly from the distal end of the first lower part and movably mounted on the first lower part,
wherein the lower section of the tower has a first pipe-laying configuration for laying pipeline in which the second upper part is positioned above the first lower part and pipe is passed from the second upper part to the first lower part when, in use, it is being laid, and a second low-height configuration in which the second upper part is moved relative to the first lower part and the overall height of the lower section of the tower is reduced.

12. A vessel as claimed in claim 11, wherein the tower comprises a travelling clamp wherein its travel path along the tower is limited to the lower section of the tower.

13. A vessel as claimed in claim 12, wherein the tower comprises a winch system for effecting movement of the travelling clamp, the winch system comprising an upper pulley wheel and a cable connected to the travelling clamp and passed over the upper pulley wheel, wherein the upper pulley wheel is moveable from the second upper part of the lower section of the tower to the first lower part of the lower section of the tower such that the upper pulley wheel can be moved to the first lower part of the lower section of the tower when the tower is configured into the low-height configuration.

14. A vessel as claimed in claim 11, wherein the upper section of the tower and the second upper part of the lower section of the tower are approximately parallel to the main deck of the vessel in the second low-height configuration.

15. A vessel as claimed in claim 11, wherein the pipe-laying tower is capable of accommodating a tension in the pipeline being laid of 2000 metric tons.

16. A vessel as claimed in claim 11, wherein the tension in the pipeline being laid is taken by the lower section, and not by the upper section.

17. The pipe-laying vessel as claimed in claim 11, further comprising:
a pipestring elevator for rotating a pipestring from a substantially horizontal orientation at a base of the tower to an orientation substantially parallel to the tower, and
wherein the pipestring elevator is mounted for movement along the tower such that the pipestring elevator can rotate the pipestring to be substantially parallel to the tower and then lift the pipestring up the tower.

18. A pipe-laying vessel including a pipe-laying tower extending upwardly from the vessel, the tower comprising:
a hang off clamp assembly provided at a lower region of the tower for clamping pipeline that has been deployed from the vessel,
a travelling clamp with a travel path along a length of the tower for laying pipeline,
a lower section extending upwardly from a proximal end to a distal end above the main deck of the vessel, and
an upper section extending upwardly from the lower section and having a length that is at least one third of the length of the lower section,
wherein the travel path of the travelling clamp is limited to the lower section of the tower; and wherein the tower comprises three line-up clamps located on the upper section of the tower.

19. A vessel as claimed in claim 18, wherein one of the line-up clamps is a friction clamp.

20. A vessel as claimed in claim 18, wherein a second further clamp is located on the lower section of the tower.

21. The pipe-laying vessel as claimed in claim 18, further comprising:
a pipestring elevator for rotating a pipestring from a substantially horizontal orientation at a base of the tower to an orientation substantially parallel to the tower, and
wherein the pipestring elevator is mounted for movement along the tower such that the pipestring elevator can rotate the pipestring to be substantially parallel to the tower and then lift the pipestring up the tower.

22. A pipe-laying vessel including pipe-laying apparatus configured to S-lay a pipeline from the vessel along an S-lay pipe-laying path, wherein, at a same time that the pipe-laying vessel includes pipe-laying apparatus that is configured to S-lay a pipeline from the vessel, the vessel further includes a pipe-laying tower configured to J-lay a pipeline from the vessel,
the pipe-laying tower comprising:
a lower section and an upper section,
the lower section extending upwardly from a proximal end to a distal end above the main deck of the vessel, and
the lower section of the pipe-laying tower is divided into a lower part, wherein the lower part extends upwardly from a proximal end to a distal end above the main deck of the vessel, and an upper part extending upwardly from the distal end of the first lower part, and the upper part is configured to pivot with respect to the lower part;
wherein the lower section has a first pipe-laying configuration for laying pipeline in which the upper part is positioned above the lower part and pipe is passed from the upper part to the lower part when, in use, is being laid.

23. A vessel as claimed in claim 22, wherein the pipe-laying tower extends upwardly at a fixed angle of approximately 90 degrees with respect to a main deck of the vessel.

24. A vessel as claimed in claim 22, wherein the pipe-laying tower is positioned to one side of the centre-line of the vessel.

25. A method of laying pipeline with the vessel of claim 22, the method comprising:
S-laying a part of the pipeline from a vessel, and
J-laying another part of the pipeline from a pipe-laying tower on the vessel.

26. The pipe-laying vessel as claimed in claim 22, further comprising:
a pipestring elevator for rotating a pipestring from a substantially horizontal orientation at a base of the tower to an orientation substantially parallel to the tower, and
wherein the pipestring elevator is mounted for movement along the tower such that the pipestring elevator can rotate the pipestring to be substantially parallel to the tower and then lift the pipestring up the tower.

27. A vessel as claimed in claim 22, wherein the lower section has a second low-height configuration in which the upper part is moved relative to the lower part and the overall height of the lower section of the tower is reduced.

28. A vessel as claimed in claim 22, wherein the upper section is movably mounted on the lower section.

29. A vessel as claimed in claim 22, wherein the vessel comprises a separated pipestring elevator configured to rotate a pipestring from the substantially horizontally orientation at the base of the tower to an orientation substantially parallel to the tower.

30. A vessel as claimed in claim 22, wherein the lower part includes a clamping mechanism, and the first pipe-laying configuration is for laying pipeline in which the upper part is positioned above the lower part and pipe is passed from the upper part to the clamping mechanism of the lower part when, in use, is being laid.

31. A vessel as claimed in claim 30, wherein the clamping mechanism includes one of a clamp, a travelling block, and a tensioner.

* * * * *